United States Patent
Oribe et al.

(10) Patent No.: US 10,392,310 B2
(45) Date of Patent: *Aug. 27, 2019

(54) POROUS PLATE-SHAPED FILLER AGGREGATE, PRODUCING METHOD THEREFOR, AND HEAT-INSULATION FILM CONTAINING POROUS PLATE-SHAPED FILLER AGGREGATE

(71) Applicant: NGK INSULATORS, LTD., Nagoya (JP)

(72) Inventors: Akinobu Oribe, Nagoya (JP);
Hiroharu Kobayashi, Nagoya (JP);
Takahiro Tomita, Nagoya (JP);
Shinsaku Maeda, Nagoya (JP);
Yasutaka Awakura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,726

(22) Filed: Aug. 8, 2016

(65) Prior Publication Data

US 2016/0340256 A1 Nov. 24, 2016

Related U.S. Application Data

(63) Continuation of application No. PCT/JP2015/053885, filed on Feb. 5, 2015.

(30) Foreign Application Priority Data

Feb. 10, 2014 (JP) .................................. 2014-023775

(51) Int. Cl.
*B32B 5/16* (2006.01)
*C08K 7/24* (2006.01)
(Continued)

(52) U.S. Cl.
CPC ........ *C04B 35/486* (2013.01); *B23K 26/0624* (2015.10); *B23K 26/38* (2013.01);
(Continued)

(58) Field of Classification Search
CPC .... B32B 3/10; B32B 3/14; B32B 3/18; B32B 3/22; B32B 5/16; B32B 5/22; B32B 5/30;
(Continued)

(56) References Cited

U.S. PATENT DOCUMENTS 2,704,105 A * 3/1955 Robinson ............... H01B 3/002
423/328.2
3,225,131 A * 12/1965 Conklin ................... H01B 7/02
162/138

(Continued)

FOREIGN PATENT DOCUMENTS

JP 04-062985 A1 2/1992
JP 2003-046206 A1 2/2003
(Continued)

OTHER PUBLICATIONS

International Search Report and Written Opinion (Application No. PCT/JP2015/053885) dated May 19, 2015.

*Primary Examiner* — Z. Jim Yang
(74) *Attorney, Agent, or Firm* — Burr & Brown, PLLC

(57) ABSTRACT

The porous plate-shaped filler aggregate includes a plurality of the porous plate-shaped fillers. The porous plate-shaped fillers have a uniform plate shape with an aspect ratio of 3 or more, a minimum length of 0.1 to 50 μm, a porosity of 20 to 99%, and the deviation of the maximum length among a plurality of the porous plate-shaped fillers, which is obtained by the following formula, is 10% or less.

Deviation of the maximum length (%)=standard deviation of the maximum length/average value of the maximum length×100

(Continued)

(Here, 'maximum length' is the longest length when the porous plate-shaped fillers are held between a pair of parallel planes.)

18 Claims, 14 Drawing Sheets

(51) Int. Cl.

| | | |
|---|---|---|
| C04B 35/486 | (2006.01) | |
| B32B 5/30 | (2006.01) | |
| B26D 3/08 | (2006.01) | |
| C04B 38/06 | (2006.01) | |
| C04B 38/08 | (2006.01) | |
| C09D 1/00 | (2006.01) | |
| C09D 201/00 | (2006.01) | |
| F16L 59/04 | (2006.01) | |
| B32B 18/00 | (2006.01) | |
| C04B 35/622 | (2006.01) | |
| C04B 35/626 | (2006.01) | |
| C04B 35/634 | (2006.01) | |
| C04B 35/638 | (2006.01) | |
| C04B 38/00 | (2006.01) | |
| B23K 26/0622 | (2014.01) | |
| B23K 26/38 | (2014.01) | |
| B23K 26/40 | (2014.01) | |
| C04B 35/80 | (2006.01) | |
| C09D 7/61 | (2018.01) | |
| C09D 5/00 | (2006.01) | |
| C09D 7/40 | (2018.01) | |
| B23K 101/18 | (2006.01) | |
| B23K 103/00 | (2006.01) | |
| B23K 101/00 | (2006.01) | |

(52) U.S. Cl.
CPC ............ *B23K 26/40* (2013.01); *B26D 3/08* (2013.01); *B32B 5/16* (2013.01); *B32B 5/30* (2013.01); *B32B 18/00* (2013.01); *C04B 35/62218* (2013.01); *C04B 35/62222* (2013.01); *C04B 35/62625* (2013.01); *C04B 35/634* (2013.01); *C04B 35/638* (2013.01); *C04B 35/80* (2013.01); *C04B 38/009* (2013.01); *C04B 38/06* (2013.01); *C04B 38/08* (2013.01); *C09D 1/00* (2013.01); *C09D 5/00* (2013.01); *C09D 7/61* (2018.01); *C09D 7/70* (2018.01); *C09D 201/00* (2013.01); *F16L 59/04* (2013.01); *B23K 2101/003* (2018.08); *B23K 2101/18* (2018.08); *B23K 2103/52* (2018.08); *B23K 2103/54* (2018.08); *C01P 2004/20* (2013.01); *C01P 2004/22* (2013.01); *C04B 2235/3246* (2013.01); *C04B 2235/5292* (2013.01); *C04B 2235/5296* (2013.01); *C04B 2235/5436* (2013.01); *C04B 2235/5445* (2013.01); *C04B 2235/6025* (2013.01); *C04B 2235/612* (2013.01); *C04B 2237/38* (2013.01); *C08K 7/24* (2013.01)

(58) Field of Classification Search
CPC ......... Y10T 428/2982; Y10T 428/2991–2998; Y10T 428/16; Y10T 428/161; Y10T 428/162; Y10T 428/163–168; Y10T 428/17; Y10T 428/18–187
See application file for complete search history.

(56) References Cited

U.S. PATENT DOCUMENTS

| | | | | |
|---|---|---|---|---|
| 4,660,861 A * | 4/1987 | Argy | ............... | F16L 59/029 |
| | | | | 138/149 |
| 5,072,886 A * | 12/1991 | Morrison | ............. | B01J 23/04 |
| | | | | 241/1 |
| 5,167,988 A * | 12/1992 | Yano | ............... | C23D 3/00 |
| | | | | 428/324 |
| 5,665,810 A * | 9/1997 | Patchett | ............. | B29C 49/00 |
| | | | | 524/449 |
| 5,932,309 A * | 8/1999 | Smith | ............... | B32B 27/20 |
| | | | | 428/373 |
| 6,165,594 A * | 12/2000 | Moh | ............... | G09F 3/02 |
| | | | | 428/207 |
| 7,514,145 B2 * | 4/2009 | Akioka | ............. | C08J 3/122 |
| | | | | 425/6 |
| 2003/0038278 A1 * | 2/2003 | Ishihara | ............. | H01L 23/15 |
| | | | | 252/500 |
| 2004/0052976 A1 * | 3/2004 | Buczek | ............. | B05D 1/40 |
| | | | | 427/598 |
| 2004/0175618 A1 * | 9/2004 | Inoue | ............... | C01G 51/42 |
| | | | | 429/231.1 |
| 2005/0019575 A1 * | 1/2005 | Jungnitz | ............. | C09C 1/0015 |
| | | | | 428/403 |
| 2005/0113485 A1 | 5/2005 | Yokoi | | |
| 2005/0182153 A1 | 8/2005 | Yokoi | | |
| 2005/0208338 A1 * | 9/2005 | Fernie | ............... | C23C 30/00 |
| | | | | 428/701 |
| 2005/0287348 A1 * | 12/2005 | Faler | ............... | B32B 5/18 |
| | | | | 428/315.5 |
| 2006/0153769 A1 * | 7/2006 | Robinson | ............. | C01F 7/02 |
| | | | | 423/625 |
| 2006/0231201 A1 * | 10/2006 | Smith | ............... | B32B 5/16 |
| | | | | 156/307.3 |
| 2006/0257662 A1 * | 11/2006 | Bujard | ............... | C09C 1/0015 |
| | | | | 428/404 |
| 2007/0098803 A1 * | 5/2007 | Dobbs | ............... | A61K 9/14 |
| | | | | 424/489 |
| 2007/0243337 A1 * | 10/2007 | Xiong | ............... | B82Y 30/00 |
| | | | | 427/553 |
| 2007/0259185 A1 * | 11/2007 | Hingst | ............... | B32B 18/00 |
| | | | | 428/408 |
| 2008/0058459 A1 * | 3/2008 | Brand | ............... | C08K 9/04 |
| | | | | 524/493 |
| 2008/0107856 A1 * | 5/2008 | Argoitia | ............. | C09C 1/0015 |
| | | | | 428/43 |
| 2008/0171811 A1 * | 7/2008 | Guiselin | ............. | B01J 21/04 |
| | | | | 523/216 |
| 2008/0280140 A1 * | 11/2008 | Ferrari | ............... | C25F 3/12 |
| | | | | 428/402 |
| 2009/0145332 A1 * | 6/2009 | Wheeler | ............. | C09C 1/0018 |
| | | | | 106/400 |
| 2009/0238982 A1 * | 9/2009 | Florent | ............... | C03C 17/007 |
| | | | | 427/387 |
| 2010/0159329 A1 * | 6/2010 | Sugiura | ............. | H01M 4/131 |
| | | | | 429/231.4 |
| 2010/0266847 A1 * | 10/2010 | Wickert | ............. | B01J 20/28016 |
| | | | | 428/402 |
| 2010/0277872 A1 * | 11/2010 | Ito | ............... | H01L 23/3737 |
| | | | | 361/715 |
| 2011/0027549 A1 * | 2/2011 | Boutaghou | ......... | B24D 18/0054 |
| | | | | 428/206 |
| 2011/0040013 A1 * | 2/2011 | Tsapatsis | ............. | B01D 69/148 |
| | | | | 524/430 |
| 2011/0076480 A1 * | 3/2011 | Skoog | ............... | C04B 26/30 |
| | | | | 428/312.6 |
| 2011/0114870 A1 * | 5/2011 | Yang | ............... | C04B 26/10 |
| | | | | 252/62 |
| 2012/0028018 A1 * | 2/2012 | Cho | ............... | C03C 14/004 |
| | | | | 428/220 |
| 2012/0171438 A1 * | 7/2012 | Roberts, III | ......... | B82Y 30/00 |
| | | | | 428/206 |
| 2012/0189871 A1 * | 7/2012 | Hecht | ............... | F01D 5/288 |
| | | | | 428/697 |

(56) References Cited

U.S. PATENT DOCUMENTS

| | | |
|---|---|---|
| 2013/0177739 A1 | 7/2013 | Syoujiguchi |
| 2013/0203328 A1* | 8/2013 | Givot .................. B24D 5/02 451/548 |
| 2013/0224591 A1 | 8/2013 | Kishimi et al. |
| 2013/0260139 A1* | 10/2013 | Kamada ................ C03C 17/007 428/328 |
| 2013/0288055 A1* | 10/2013 | Doshita .................. C01B 33/12 428/402 |
| 2013/0289133 A1* | 10/2013 | Doshita .................. C01B 33/12 514/769 |
| 2014/0050925 A1* | 2/2014 | Sueda ..................... C01G 9/02 428/402 |
| 2014/0212655 A1* | 7/2014 | Matsuno ............. G02B 5/208 428/323 |
| 2014/0348559 A1* | 11/2014 | Miyahara ........... G03G 15/2057 399/333 |
| 2015/0010721 A1* | 1/2015 | Tanida ................ H05K 5/0086 428/34.5 |
| 2015/0104626 A1 | 4/2015 | Tomita et al. |
| 2015/0118482 A1* | 4/2015 | Kagawa ................ C04B 35/111 428/188 |
| 2015/0329431 A1* | 11/2015 | Deville ................ C04B 35/111 428/188 |
| 2016/0025035 A1* | 1/2016 | Kadoshima ............... F16J 1/01 252/62 |
| 2016/0185074 A1* | 6/2016 | Kagawa ............. H01L 23/3737 428/341 |

FOREIGN PATENT DOCUMENTS

| | | | |
|---|---|---|---|
| JP | 2004-043291 A1 | 2/2004 | |
| JP | 2004-067500 A1 | 3/2004 | |
| JP | 2006-278761 A1 | 10/2006 | |
| JP | 2008-506802 A1 | 3/2008 | |
| JP | 2009-533306 A1 | 9/2009 | |
| JP | 2012-035492 A1 | 2/2012 | |
| JP | 2012-504094 A1 | 2/2012 | |
| JP | WO 2012096171 A1 * | 7/2012 | ............. C01B 33/12 |
| WO | 2012/026127 A1 | 3/2012 | |
| WO | 2013/125021 A1 | 8/2013 | |
| WO | 2013/191263 A1 | 12/2013 | |

\* cited by examiner

POROUS PLATE-SHAPED FILLER AGGREGATE, PRODUCING METHOD THEREFOR, AND HEAT-INSULATION FILM CONTAINING POROUS PLATE-SHAPED FILLER AGGREGATE

BACKGROUND OF THE INVENTION

1. Field of the Invention

The present invention relates to a porous plate-shaped filler aggregate used while contained in a heat-insulation film for improving heat insulation effect, a producing method therefor and the heat-insulation film containing the porous plate-shaped filler aggregate.

2. Description of Related Art

A heat-insulation film such that porous fillers with low thermal conductivity are dispersed and disposed in a matrix made of resin is known as a heat-insulation film for improving heat insulation effect and flame retardance of an object by forming on the surface of the object. In Patent Document 1, porous plate-shaped fillers with an aspect ratio of 3 or more, a minimum length of 0.1 to 50 µm and a porosity of 20 to 99% are disclosed as the fillers contained in a heat-insulation film. The heat-insulation film performs high heat insulation effect when such porous plate-shaped fillers are disposed in a layered state (laminated) in the heat-insulation film.

Also, in Patent Document 1, a method for firing a green sheet formed out of a material containing ceramic powder to grind after firing is disclosed as a producing method for such porous plate-shaped fillers. In addition, a method for producing porous thin plate-shaped fillers without grinding after firing by firing after performing processing such as cutting and punching into a predetermined planar shape in a state of a green sheet before firing is disclosed as another producing method.

CITATION LIST

Patent Document

[Patent Document 1] WO 2013/191263 A

SUMMARY OF THE INVENTION

Problem to be Solved by the Invention

However, simple grinding of a green sheet after firing causes deviation in aspect ratio (maximum length/minimum length) of porous plate-shaped fillers to be obtained. In particular, the deviation of the maximum length becomes so great that the shape of the fillers becomes non-uniform (incidentally, ordinarily, the thickness of the fired green sheet before grinding becomes the minimum length of the porous plate-shaped fillers as a ground product, so that deviation scarcely occurs in the minimum length). Then, the use of the porous plate-shaped fillers with a non-uniform shape as the contents of a heat-insulation film causes the porous plate-shaped fillers to be disposed in a layered state (laminated) with difficulty in the heat-insulation film, so as not to allow sufficient heat insulation effect occasionally.

Also, the performance of processing such as cutting and punching in a state of a green sheet before firing causes the workpiece to become so minutely powdery before firing as to be handled with difficulty. Thus, the manufacturing operation thereafter becomes difficult. In addition, the powdery workpiece before firing is soft and is easily deformed in handling, so that the yield deteriorates.

The present invention has been made in view of such conventional circumstances, and one of the objects thereof is to provide a porous plate-shaped filler aggregate including a plurality of porous plate-shaped fillers having a uniform shape and small deviation of the maximum length. Also, another object thereof is to provide a method capable of producing such a porous plate-shaped filler aggregate easily with a high yield. Further, another object thereof is to provide a heat-insulation film in which the porous plate-shaped fillers are so easily disposed in a layered state (laminated) by containing such a porous plate-shaped filler aggregate as to improve heat insulation effect.

Means for Solving the Problem

In order to achieve the objects, the present invention provides a porous plate-shaped filler aggregate, a producing method for the porous plate-shaped filler aggregate, and a heat-insulation film described below.

According to a first aspect of the present invention, a porous plate-shaped filler aggregate is provided including a plurality of porous plate-shaped fillers wherein the porous plate-shaped fillers have a uniform plate shape with an aspect ratio of 3 or more, a minimum length of 0.1 to 50 µm, a porosity of 20 to 99%, and a deviation of a maximum length among a plurality of the porous plate-shaped fillers, obtained by the following formula, is 10% or less.

Deviation of the maximum length (%)=standard deviation of the maximum length/average value of the maximum length×100

(Here, 'maximum length' is the longest length when the porous plate-shaped fillers are held between a pair of parallel planes.)

According to a second aspect of the present invention, the porous plate-shaped filler aggregate according to the first aspect is provided, wherein the porous plate-shaped fillers have pores with an average pore diameter of 10 to 500 nm.

According to a third aspect of the present invention, the porous plate-shaped filler aggregate according to the first or second aspects is provided, wherein a thermal conductivity of the porous plate-shaped fillers is 1 W/(m·K) or less.

According to a fourth aspect of the present invention, the porous plate-shaped filler aggregate according to any one of the first to third aspects is provided, wherein a volumetric heat capacity of the porous plate-shaped fillers is 10 to 3000 kJ/(m$^3$·K).

According to a fifth aspect of the present invention, a method for producing the porous plate-shaped filler aggregate according to any one of the first to fourth aspects is provided, wherein a cut with a depth of 0.2 times or more a thickness of a green sheet after firing is formed on one surface of the green sheet formed from a material containing a component of the porous plate-shaped fillers to fire the green sheet and thereafter grind an obtained sheet-shaped fired body along the cut.

According to a sixth aspect of the present invention, the method for producing the porous plate-shaped filler aggregate according to the fifth aspect is provided, wherein a method for forming the cut is a method by using an edged tool or a laser processing machine such as to allow laser irradiation at a pulse width of 10 pico-second or less.

According to a seventh aspect of the present invention, the method for producing the porous plate-shaped filler aggregate according to the sixth aspect is provided, wherein the edged tool has a latticed edge.

According to an eighth aspect of the present invention, the method for producing the porous plate-shaped filler aggregate according to the sixth or seventh aspects is provided, wherein a method for forming the cut on one surface of the green sheet by using the edged tool is a method for pressing the edged tool against one surface of the green sheet by a pressing machine or a rolling machine.

According to a ninth aspect of the present invention, the method for producing the porous plate-shaped filler aggregate according to the eighth aspect is provided, wherein a pressure for pressing the edged tool against one surface of the green sheet is 3 MPa or more.

According to a tenth aspect of the present invention, the method for producing the porous plate-shaped filler aggregate according to any one of the fifth to ninth aspects is provided, wherein a method for grinding the sheet-shaped fired body along the cut is any method selected from the group consisting of a method by manual breaking, a method by using a grinder, a method by using a shredder and a method by irradiating ultrasonic waves.

According to an eleventh aspect of the present invention, a method for producing the porous plate-shaped filler aggregate according to any one of the first to fourth aspects is provided, wherein a green sheet formed from a material containing a component of the porous plate-shaped fillers is fired, and a cut with a depth of 0.2 times or more a thickness of a sheet-shaped fired body is formed on one surface of the obtained sheet-shaped fired body to grind the sheet-shaped fired body along the cut.

According to a twelfth aspect of the present invention, the method for producing the porous plate-shaped filler aggregate according to the eleventh aspect is provided, wherein a method for forming the cut is a method by using an edged tool or a laser processing machine such as to allow laser irradiation at a pulse width of 10 pico-second or less.

According to a thirteenth aspect of the present invention, the method for producing the porous plate-shaped filler aggregate according to the twelfth aspect is provided, wherein the edged tool has a latticed edge.

According to a fourteenth aspect of the present invention, the method for producing the porous plate-shaped filler aggregate according to the twelfth or thirteenth aspects is provided, wherein a method for forming the cut on one surface of the sheet-shaped fired body by using the edged tool is a method for pressing the edged tool against one surface of the sheet-shaped fired body by a pressing machine or a rolling machine.

According to a fifteenth aspect of the present invention, the method for producing the porous plate-shaped filler aggregate according to the fourteenth aspect is provided, wherein a pressure for pressing the edged tool against one surface of the sheet-shaped fired body is 3 MPa or more.

According to a sixteenth aspect of the present invention, the method for producing the porous plate-shaped filler aggregate according to any one of the eleventh to fifteenth aspects is provided, wherein a method for grinding the sheet-shaped fired body along the cut is any method selected from the group consisting of a method by manual breaking, a method by using a grinder, a method by using a shredder and a method by irradiating ultrasonic waves.

According to a seventeenth aspect of the present invention, a heat-insulation film including the porous plate-shaped filler aggregate according to any one of the first to fourth aspects is provided.

According to an eighteenth aspect of the present invention, the heat-insulation film according to the seventeenth aspect is provided, wherein the porous plate-shaped fillers composing the porous plate-shaped filler aggregate are disposed in a layered state.

According to a nineteenth aspect of the present invention, the heat-insulation film according to the seventeenth or eighteenth aspects is provided, wherein a thickness is 1 µm to 5 mm.

According to a twentieth aspect of the present invention, the heat-insulation film according to any one of the seventeenth to nineteenth aspects is provided, wherein a thermal conductivity is 1 W/(m·K) or less.

Effect of the Invention

A porous plate-shaped filler aggregate of the present invention is composed of a plurality of porous plate-shaped fillers having a uniform shape and small deviation of the maximum length, so that the porous plate-shaped fillers are so easily disposed in a layered state (laminated) in the case of being contained in a heat-insulation film as to bring high heat insulation effect to the heat-insulation film. Also, a producing method for the porous plate-shaped filler aggregate of the present invention allows the porous plate-shaped filler aggregate composed of a plurality of porous plate-shaped fillers having a uniform shape and small deviation of the maximum length by reason of grinding a sheet-shaped fired body along a cut formed previously. Also, an object to be handled is in the shape of a sheet before grinding as the final process, so that the aggregate is easily handled and the manufacturing operation is easy. Also, grinding is performed for the fired body and not such as to work into powder in a soft state before firing, so that the fillers are deformed with difficulty in the manufacturing processes to allow a high yield. In addition, a heat-insulation film of the present invention contains the porous plate-shaped filler aggregate of the present invention as described above, so that the porous plate-shaped fillers are easily disposed in a layered state (laminated) in the heat-insulation film; consequently, thermal conductivity becomes so sufficiently low as to perform high heat insulation effect.

DETAILED DESCRIPTION OF THE INVENTION

The present invention is hereinafter described on the basis of specific embodiments, and is not interpreted while limited thereto. Various changes, modifications and improvements can be made on the basis of the knowledge of those skilled in the art unless they deviate from the scope of the present invention.

1. Porous Plate-Shaped Filler Aggregate

Figure 1:
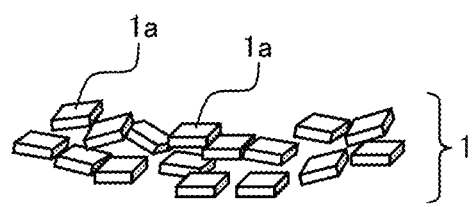
FIG. 1 is a perspective view schematically showing an example of an embodiment of a porous plate-shaped filler aggregate of the present invention.
Figure 2:
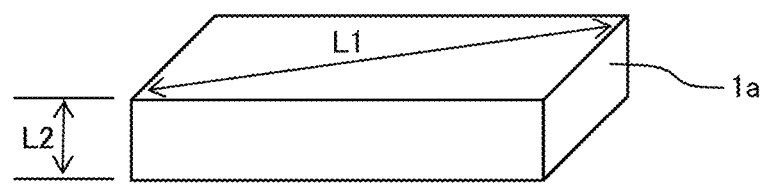
FIG. 2 is a perspective view schematically showing an example of porous plate-shaped fillers composing a porous plate-shaped filler aggregate of the present invention.
Figure 3:
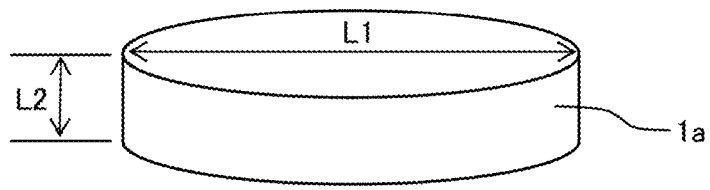
FIG. 3 is a perspective view schematically showing another example of porous plate-shaped fillers composing a porous plate-shaped filler aggregate of the present invention.

As shown in FIG. 1, a porous plate-shaped filler aggregate 1 of the present invention includes a plurality of porous plate-shaped fillers 1a. FIG. 2 shows an example of porous plate-shaped fillers composing a porous plate-shaped filler aggregate of the present invention, and FIG. 3 shows another example of porous plate-shaped fillers composing a porous plate-shaped filler aggregate of the present invention. The porous plate-shaped fillers 1a composing the porous plate-shaped filler aggregate 1 of the present invention have a uniform plate shape with an aspect ratio of 3 or more, a minimum length L2 of 0.1 to 50 µm and a porosity of 20 to 99%.

Incidentally, in the specification, 'aspect ratio' is defined by maximum length/minimum length of the porous plate-shaped fillers 1a. Here, 'maximum length' is the longest length when a particle (the porous plate-shaped fillers 1a) is held between a pair of parallel planes. Similarly, 'minimum length' is the shortest length when a particle is held between a pair of parallel planes, and corresponds to the so-called thickness in the case of a flat plate shape. For example, like FIG. 2, in the porous plate-shaped fillers 1a such that the surface shape of the plate is a quadrilateral, the length of a diagonal line of the quadrilateral surface becomes the maximum length L1 and the thickness becomes the minimum length L2. Also, like FIG. 3, in the porous plate-shaped fillers 1a such that the surface shape of the plate is a circle, the length of a diameter of the circular surface becomes the maximum length L1 and the thickness becomes the minimum length L2.

'Plate shape' of the porous plate-shaped fillers includes not merely a flat plate shape (a flat and uncurved plate) but also a curved plate shape and a plate shape with inconstant thickness (the minimum length) if the aspect ratio is 3 or more and the minimum length L2 is 0.1 to 50 Also, the shapes such as a fibrous shape, a needle shape and a lump shape are included. Among them, the porous plate-shaped filler 1a composing the porous plate-shaped filler aggregate 1 of the present invention is preferably in a flat plate shape. Also, the surface shape of the plate may be any of a square, a quadrilateral, a triangle, a hexagon and a circle if the surface shape is a uniform shape in all of the porous plate-shaped fillers 1a composing the porous plate-shaped filler aggregate 1.

Also, the porous plate-shaped filler aggregate 1 of the present invention is such that the deviation of the maximum length L1 among a plurality of the porous plate-shaped fillers 1a, which is obtained by the following formula, is 10% or less.

Deviation of the maximum length (%)=standard deviation of the maximum length/average value of the maximum length×100

Incidentally, this 'deviation of the maximum length' is a value obtained by the above formula on the basis of the maximum length measured from electron microscope images of approximately 20 pieces of the porous plate-shaped fillers 1a selected optionally (at random) from the porous plate-shaped filler aggregate 1.

With regard to the porous plate-shaped filler aggregate 1 of which the deviation of the maximum length L1, which is obtained by the above formula, is 10% or less, the deviation of the aspect ratio of a plurality of the porous plate-shaped fillers 1a composing it is small and the fillers are approximately uniform in shape. Thus, the porous plate-shaped fillers 1a are so easily disposed in a layered state (laminated) in the case of being contained in a heat-insulation film as to bring high heat insulation effect to the heat-insulation film. Incidentally, this deviation of the maximum length L1 is preferably 8% or less, more preferably 5% or less.

The porous plate-shaped fillers 1a preferably have pores with an average pore diameter of 10 to 500 nm, more preferably an average pore diameter of 10 to 300 nm, far more preferably an average pore diameter of 10 to 100 nm. The average pore diameter of the pores in the porous plate-shaped fillers 1a is preferably smaller by reason of decreasing thermal conductivity, while an average pore diameter of less than 10 nm brings a possibility of increasing production costs. On the other hand, an average pore diameter of more than 500 nm brings a possibility of increasing thermal conductivity too much. Incidentally, in the specification, 'average pore diameter' is a value measured by using a mercury porosimeter (mercury pressure process). However, in the case where the average pore diameter is 10 nm or less, the average pore diameter is measured by a gas adsorption operation. The number of the pores contained in a porous plate-shaped filler 1a may be one or numerous, and the pores may be closed pores or open pores. The inclusion of the porous plate-shaped fillers 1a having such pores in a heat-insulation film allows heat insulation effect to be improved by the pores.

The porosity of the porous plate-shaped fillers 1a is preferably 20 to 99%, more preferably 20 to 90%, far more preferably 20 to 80%. The inclusion of the porous plate-shaped fillers 1a having such a porosity in a heat-insulation film allows heat insulation effect to be improved by the pores.

Incidentally, in the specification, 'porosity' is obtained by the following formula.

$$\text{Porosity (\%)} = \{1 - (\text{apparent particle density/true density})\} \times 100$$

In this formula, 'apparent particle density' is measured by an immersion method using mercury. Also, 'true density' is measured by a pycnometer method after sufficiently grinding the porous plate-shaped fillers.

The minimum length of the porous plate-shaped fillers 1a is 0.1 to 50 μm, and the upper limit thereof is preferably 25 μm or less, more preferably 10 μm or less. The short minimum length of the porous plate-shaped fillers 1a allows a heat-insulation film containing the porous plate-shaped fillers 1a to be thinned. That is to say, even a thin heat-insulation film allows heat insulation effect to be improved. Also, the lower limit thereof is preferably 0.1 μm or more as described above by reason of obtaining a thin heat-insulation film. In addition, the lower limit is preferably 1 μm or more, more preferably 2 μm or more from the viewpoint of the yield during the production.

With regard to the porous plate-shaped fillers 1a, thermal conductivity is preferably 1 W/(m·K) or less, more preferably 0.5 W/(m·K) or less, far more preferably 0.3 W/(m·K) or less. The inclusion of the porous plate-shaped fillers 1a with such thermal conductivity in a heat-insulation film allows heat insulation effect to be improved.

Incidentally, in the specification, 'thermal conductivity' is obtained by the following formula.

$$\text{Thermal conductivity (W/(m·K))} = \text{thermal diffusivity} \times \text{specific heat} \times \text{density}$$

In this formula, 'thermal diffusivity' is measured by an optical alternating current method. Also, 'specific heat' is measured by DSC method. 'Density' is measured by a mercury porosimeter.

With regard to the porous plate-shaped fillers 1a, volumetric heat capacity is preferably 10 to 3000 kJ/(m³·K), more preferably 10 to 2500 kJ/(m³·K), far more preferably 10 to 2000 kJ/(m³·K). The inclusion of the porous plate-shaped fillers 1a with volumetric heat capacity in such a range in a heat-insulation film allows heat insulation effect to be improved.

Incidentally, in the specification, 'volumetric heat capacity' is obtained by the following formula.

$$\text{Volumetric heat capacity (kJ/(m}^3\text{·K))} = \text{specific heat} \times \text{density (apparent particle density)}$$

In this formula, 'specific heat' is measured by DSC method. Also, 'density (apparent particle density)' is measured by an immersion method using mercury. In the specification, volumetric heat capacity is generally discussed at unit volume called volumetric specific heat, so that the unit is kJ/(m³·K).

The porous plate-shaped fillers 1a are preferably composed while containing particles with a particle diameter of 1 nm to 10 μm. The particles may be particles including a crystal particle (single crystal particles) or particles including many crystal particles (polycrystal particles). That is to say, the porous plate-shaped fillers 1a is preferably an aggregate of particles with a particle diameter of this range. Incidentally, 'particle diameter' herein is such as to measure the size of a particle among particle groups composing the skeleton of the porous plate-shaped fillers 1a (diameter in the case of a globular shape, otherwise the maximum diameter) from the image of electron microscope observation. The particle diameter is more preferably 1 nm to 5 μm, far more preferably 1 nm to 1 μm. The inclusion of such porous plate-shaped fillers 1a in a heat-insulation film allows heat insulation effect to be improved.

Examples of a material for the porous plate-shaped fillers 1a include hollow glass beads, hollow ceramic beads, fly ash balloon and hollow silica. Also, examples thereof include mesoporous silica, mesoporous titania, mesoporous zirconia and Shirasu balloon.

The porous plate-shaped fillers 1a preferably contain a metallic oxide, and are composed of only a metallic oxide more preferably. The reason therefor is that ionic binding between metal and oxygen in containing a metallic oxide is so strong as compared with a nonoxide of metal (such as carbide and nitride) as to easily decrease thermal conductivity.

With regard to the porous plate-shaped fillers 1a, the metallic oxide is preferably an oxide of an element or a composite oxide of two or more elements, selected from the group consisting of Zr, Y, Al, Si, Ti, Nb, Sr and La. The reason therefor is that an oxide or a composite oxide of these elements as the metallic oxide causes heat conduction by lattice vibration (phonon) as the primary cause of heat conduction with difficulty.

Figure 4:
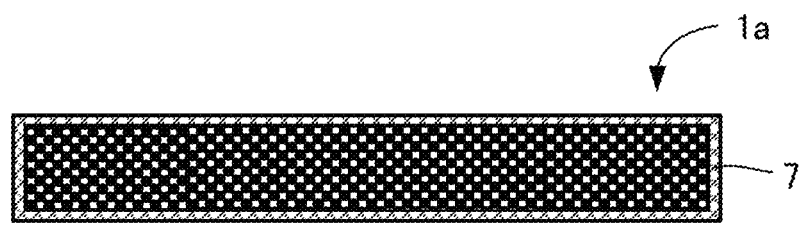
FIG. 4 is a cross-sectional view schematically showing an example of porous plate-shaped fillers composing a porous plate-shaped filler aggregate of the present invention.

As shown in FIG. 4, the porous plate-shaped filler 1a preferably has a covering layer 7 with a thickness of 1 nm to 1 μm on at least a part of the surface. In addition, the covering layer 7 is preferably a thermal resistance film for restraining heat conduction and/or reflecting radiant heat. The formation of a thermal resistance film with a thickness of several tens nm on the surface of the porous plate-shaped fillers 1a is preferable by reason of being capable of further decreasing thermal conductivity of a heat-insulation film containing the porous plate-shaped fillers 1a. The thermal resistance film may not be of the same material as the porous plate-shaped fillers 1a to be covered, and the porous plate-shaped fillers 1a are preferably covered with a material of a different kind. The thermal resistance film has no problems whether it is dense or porous, and is preferably dense. The formation of the thermal resistance film on a part of the surface of the porous plate-shaped fillers 1a allows the effect of decreasing thermal conductivity. In the case where the whole surface of the porous plate-shaped fillers 1a is covered with the thermal resistance film, the effect of decreasing thermal conductivity is improved.

2. Producing Method for Porous Plate-Shaped Filler Aggregate

Next, a producing method for a porous plate-shaped filler aggregate of the present invention is described. First, a green sheet is formed from a material containing a component of porous plate-shaped fillers composing a porous plate-shaped filler aggregate to be produced. Examples of a method for forming a green sheet include a press molding, a casting molding, an extrusion, an injection molding, a tape molding and a doctor blade method, and any of them may be used. The case where a component of porous plate-shaped fillers composing a porous plate-shaped filler aggregate to be produced is ceramics and a green sheet is formed by a doctor blade method is hereinafter described as an example.

First, a pore former, a binder, a plasticizer and a liquid medium are added to ceramics powder and mixed by a ball mill to thereby prepare slurry for molding a green sheet.

Examples of ceramics powder to be used include zirconia powder, yttria partially stabilized zirconia powder, alumina powder, silica powder, mullite powder, spinel powder, magnesia powder, yttria powder, ceria powder, silicon carbide powder, silicon nitride powder and aluminum nitride powder. Examples of a pore former to be used include latex particles, melamine resin particles, PMMA particles, polyethylene particles, polystyrene particles, foamable resin and water absorbable resin. Examples of a binder to be used include polyvinyl butyral resin (PVB), polyvinyl alcohol resin, polyvinyl acetate resin and polyacrylic resin. Examples of a plasticizer to be used include DBP (dibutyl phthalate) and DOP (dioctyl phthalate). Examples of a liquid medium to be used include xylene and 1-butanol.

Figure 5:
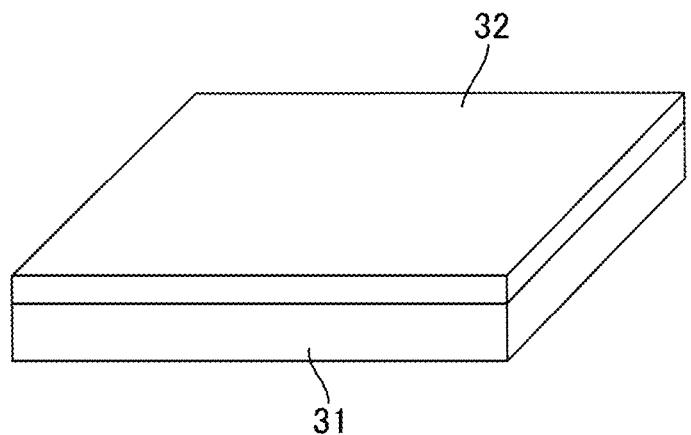
FIG. 5 is an explanatory view schematically showing an example of a producing method for a porous plate-shaped filler aggregate of the present invention.

With regard to the slurry for molding a green sheet, viscosity is preferably adjusted to 100 to 10000 cps by performing vacuum defoaming treatment. Thereafter, as shown in FIG. 5, a film 31 such as a PET film is regarded as matter to be printed on to form a green sheet 32 on this film by a doctor blade apparatus so that the thickness after firing is 0.1 to 100 μm. Incidentally, a release material such as silicone is preferably applied to the surface of the film 31 before forming the green sheet.

A cut is formed on one surface of the green sheet 32 thus formed. The cut varies with the shape of porous plate-shaped fillers to be obtained, and may be formed into a one-line shape, a plural-parallel-line shape and a latticed shape of polygons (such as a triangle, a quadrilateral and a hexagon), for example. Also, kinds of a line to be cut may be selected from a solid line, an alternate long and short dash line, a dotted line, an alternate long and two short dashes line, a broken line and a spaced line. Also, the cut is preferably formed by using an edged tool or a laser processing machine. The edged tool is preferably produced by electroforming processing and a material for the edged tool is preferably nickel. It is preferable that the edge height of the edged tool is approximately 0.02 mm and the angle of the edge is approximately 30°. Also, a laser processing machine such as to allow laser irradiation at a pulse width of 10 pico-second or less is preferably used for the laser processing machine.

Figure 6:
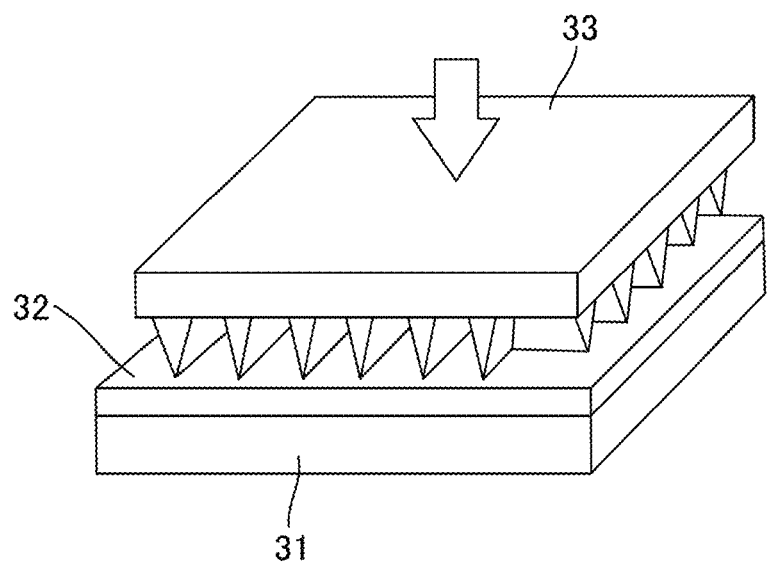
FIG. 6 is an explanatory view schematically showing an example of a producing method for a porous plate-shaped filler aggregate of the present invention.

FIG. 6 is showing an example in which a cut is formed by an edged tool 33 having a latticed edge. In this case, a cut is formed by pressing the edge of the edged tool 33 against one surface of the green sheet 32 (the surface of a surface on the opposite side to the surface contacting with the film 31).

On this occasion, the pressure at which the edged tool 33 is pressed against one surface of the green sheet 32 is preferably 3 MPa or more. Incidentally, a material testing machine, a pressing machine and a rolling machine are preferably used for pressing the edged tool against one surface of the green sheet in order to facilitate the control of the pressure. Also, before forming the cut, a release material is preferably applied to one surface of the green sheet 32 and/or the edged tool 33.

Figure 7:
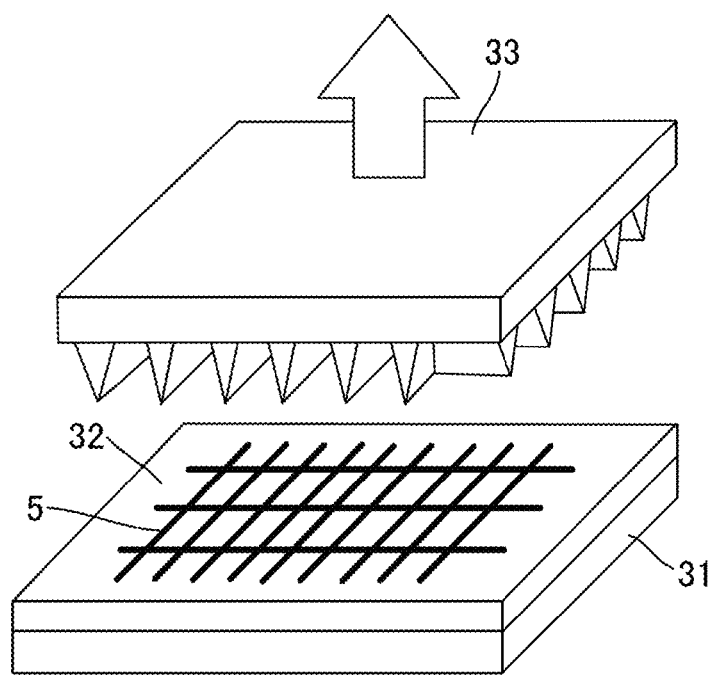
FIG. 7 is an explanatory view schematically showing an example of a producing method for a porous plate-shaped filler aggregate of the present invention.
Figure 8:
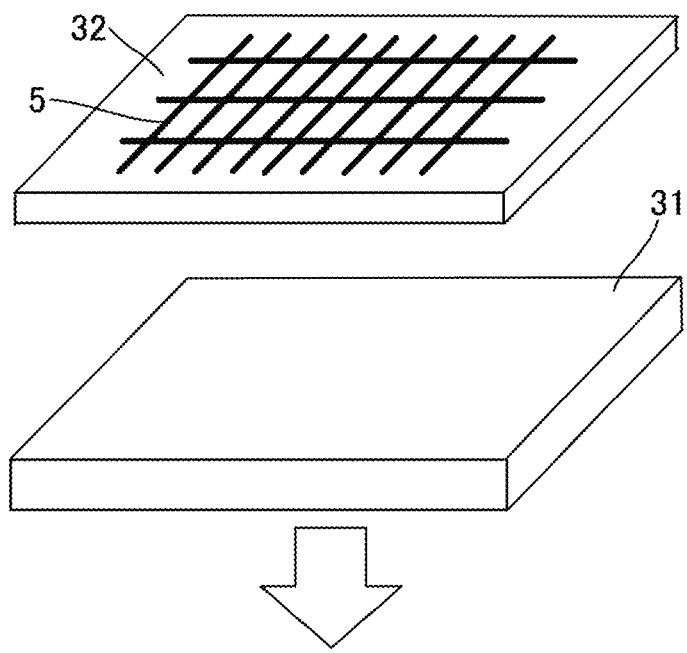
FIG. 8 is an explanatory view schematically showing an example of a producing method for a porous plate-shaped filler aggregate of the present invention.
Figure 9:
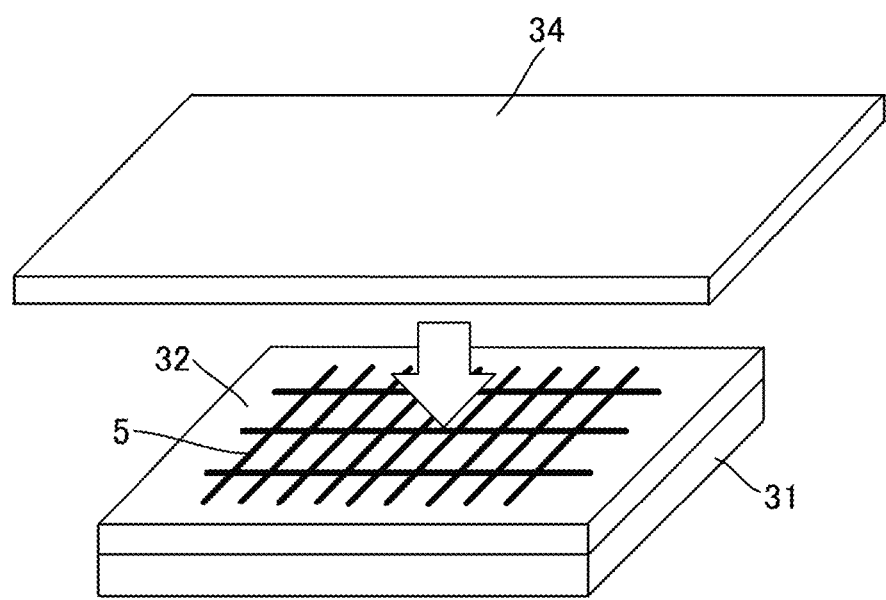
FIG. 9 is an explanatory view schematically showing an example of a producing method for a porous plate-shaped filler aggregate of the present invention.
Figure 10:
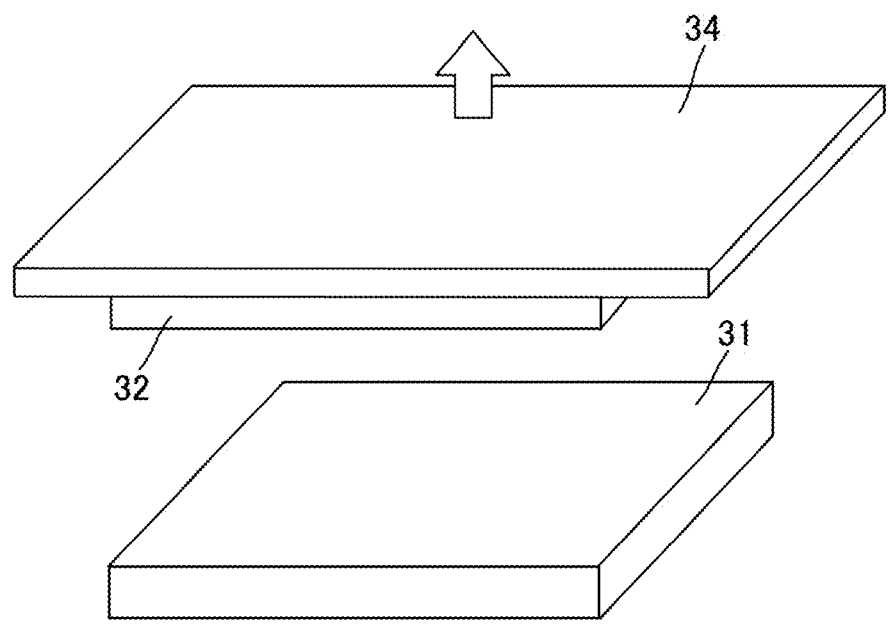
FIG. 10 is an explanatory view schematically showing an example of a producing method for a porous plate-shaped filler aggregate of the present invention.
Figure 11:
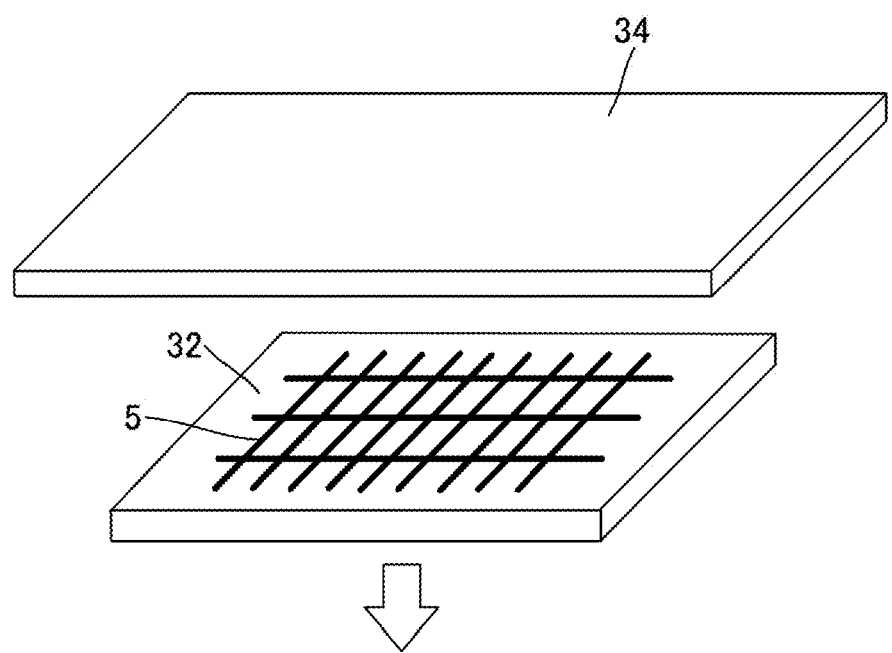
FIG. 11 is an explanatory view schematically showing an example of a producing method for a porous plate-shaped filler aggregate of the present invention.

After thus pressing the edged tool 33, the edged tool 33 is kept away from the green sheet 32 as shown in FIG. 7. Thereafter, as shown in FIG. 8, the film 31 is peeled off to collect the green sheet 32 on which a cut 5 is formed. Incidentally, in the case of being incapable of peeling off the film 31 as shown in FIG. 8, a method for collecting while transferring by utilizing a pressure sensitive adhesive sheet of a thermal peeling type is offered. The pressure sensitive adhesive sheet of a thermal peeling type is a pressure sensitive adhesive sheet such that adhesive strength deteriorates when heated to a predetermined temperature (such as 120° C.). A specific method is such that a pressure sensitive adhesive sheet 34 of a thermal peeling type is first stuck to a surface of the green sheet 32, on which the cut 5 is formed, as shown in FIG. 9. After thus sticking the pressure sensitive adhesive sheet 34 to the green sheet 32, when the pressure sensitive adhesive sheet 34 is moved in the direction of keeping away from the film 31, the green sheet 32 is peeled off the film 31 and transferred to the pressure sensitive adhesive sheet 34 as shown in FIG. 10. Then, the green sheet 32 transferred to the pressure sensitive adhesive sheet 34 is peeled off the pressure sensitive adhesive sheet 34 and collected as shown in FIG. 11 by heating the pressure sensitive adhesive sheet 34 to predetermined temperature to deteriorate adhesive strength.

Figure 12:
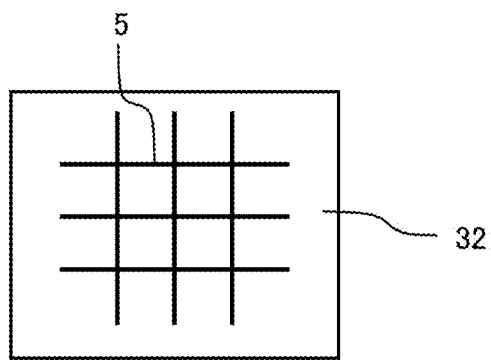
FIG. 12 is an explanatory view schematically showing an example of a producing method for a porous plate-shaped filler aggregate of the present invention.
Figure 13:
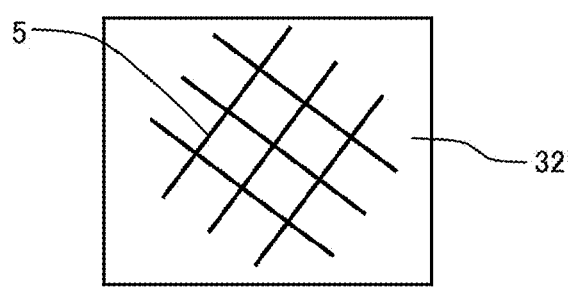
FIG. 13 is an explanatory view schematically showing an example of a producing method for a porous plate-shaped filler aggregate of the present invention.

Incidentally, the edged tool may be used while stuck to a roller such as a reduction roller. In this case, the cut 5 is formed more preferably so as to incline against a border line of the green sheet 32 as shown in FIG. 13 than the cut 5 is formed so as to be parallel or perpendicular to a border line of the green sheet 32 as shown in FIG. 12. When the cut 5 is formed so as to incline against a border line of the green sheet 32, a region of the green sheet 32 after forming the cut 5 is easily peeled off the edged tool on the occasion of pressing and rotating a roller, on which the edged tool is stuck, on the green sheet 32. Thus, the green sheet 32 is rolled in a roller with difficulty.

Figure 14:
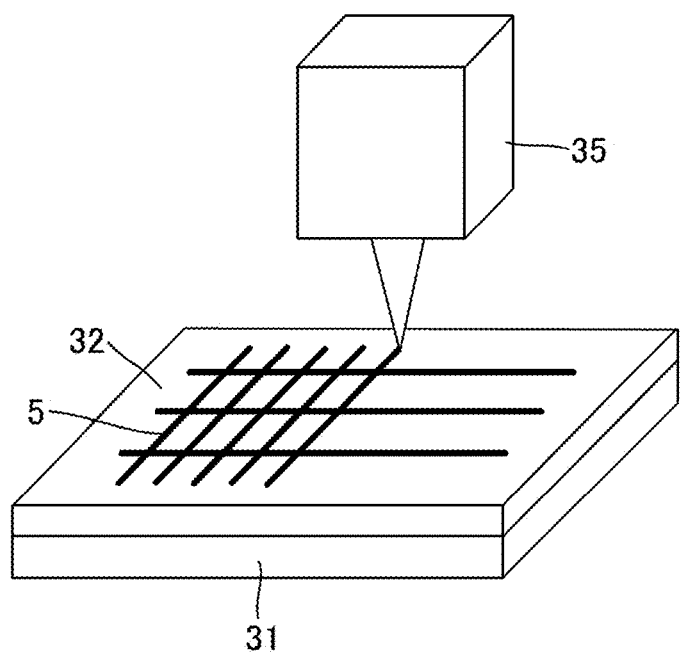
FIG. 14 is an explanatory view schematically showing an example of a producing method for a porous plate-shaped filler aggregate of the present invention.

FIG. 14 is showing an example in which a cut 5 is formed by a laser processing machine 35. In this case, a cut is formed by irradiating laser on one surface of the green sheet 32 (the surface of a surface on the opposite side to the surface contacting with the film 31) from the laser processing machine 35. On this occasion, a pulse width of laser to be irradiated is preferably 10 pico-second or less. A pulse width of 10 pico-second or less does not cause the green sheet 32 to be heated so excessively in forming the cut as to cause melting (heat slump) of the green sheet 32 with difficulty. Thus, the green sheet 32 on which the cut 5 is formed by the laser processing machine 35 is collected by the same method as the above.

Figure 15:
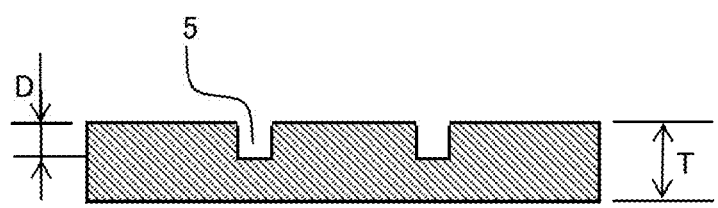
FIG. 15 is an explanatory view schematically showing an example of a producing method for a porous plate-shaped filler aggregate of the present invention.

Incidentally, in the case of forming the cut by using any of the method using an edged tool and a laser processing machine as described above or other methods, a depth D of the cut 5 shown in FIG. 15 is determined at a depth of 0.2 times or more the thickness T of the green sheet after firing (the sheet-shaped fired body). The depth D of the cut 5 is preferably determined at a depth of 0.5 times or more of the thickness T. It is previously confirmed by an experiment what value the thickness T of the green sheet after firing (the sheet-shaped fired body) is. The depth D of the cut 5 is determined at such a range, so that the sheet-shaped fired body is ground along approximately all cuts in grinding described later to allow a porous plate-shaped filler aggregate including porous plate-shaped fillers with uniform shape. On the other hand, in the case where the depth D of the cut 5 is less than 0.2 times the thickness T of the green sheet after firing (the sheet-shaped fired body), the grinding is not performed along some cuts. Thus, the shape of porous plate-shaped fillers composing a porous plate-shaped filler aggregate becomes non-uniform easily.

Figure 16:
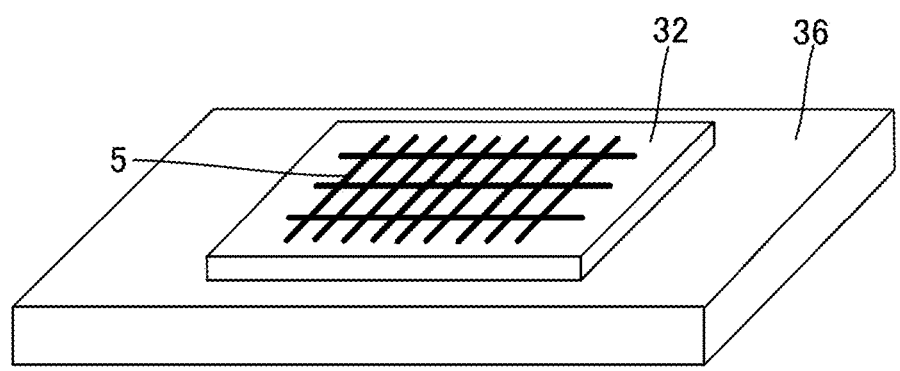
FIG. 16 is an explanatory view schematically showing an example of a producing method for a porous plate-shaped filler aggregate of the present invention.
Figure 17:
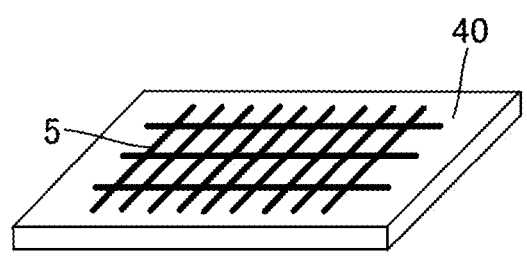
FIG. 17 is an explanatory view schematically showing an example of a producing method for a porous plate-shaped filler aggregate of the present invention.

After the cut 5 is formed in the green sheet 32 by the method as described above, which is collected, as shown in FIG. 16, the green sheet 32 is mounted on a plate-shaped refractory product 36 such as an alumina plate, and degreased as required and thereafter fired to obtain a sheet-shaped fired body 40 as shown in FIG. 17. The firing conditions may be properly determined in accordance with a material for the green sheet 32. Ordinarily, the green sheet formed from a material containing ceramics powder is preferably fired at a firing temperature of approximately 800 to 2300° C. for approximately 0.5 to 20 hours.

Figure 18:
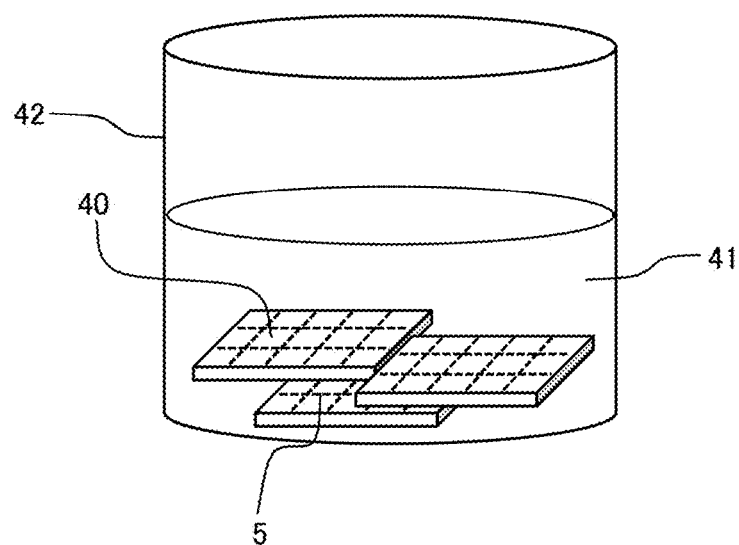
FIG. 18 is an explanatory view schematically showing an example of a producing method for a porous plate-shaped filler aggregate of the present invention.
Figure 19:
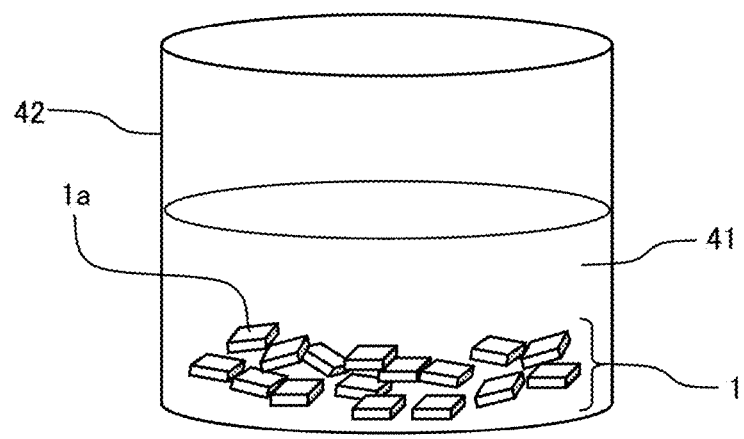
FIG. 19 is an explanatory view schematically showing an example of a producing method for a porous plate-shaped filler aggregate of the present invention.

The sheet-shaped fired body 40 thus obtained is ground along the cut 5. Preferable examples of a method for grinding include any method selected from the group consisting of a method by manual breaking, a method by using a grinder, a method by using a shredder and a method by irradiating ultrasonic waves. A grinder and a shredder may adopt any type of a disk type, a roller type, a cylinder type, an impact type, a jet type and a high-speed rotary type. In the case of grinding the sheet-shaped fired body by a method by irradiating ultrasonic waves, an ultrasonic cleaner may be used for irradiating ultrasonic waves. Specifically, first, as shown in FIG. 18, the sheet-shaped fired body 40 is put in a cleaning vessel 42 of an ultrasonic cleaner with liquid 41 such as ethanol and water. Then, the sheet-shaped fired body 40 is ground along the cut 5 by performing ultrasonic vibration for several minutes. Then, as shown in FIG. 19, a porous plate-shaped filler aggregate 1 including a plurality of porous plate-shaped fillers 1a as a ground product of the sheet-shaped fired body is obtained. The frequency of ultrasonic waves is preferably 15 to 400 kHz, more preferably 15 to 100 kHz, far more preferably 15 to 50 kHz.

In the case of grinding the sheet-shaped fired body by manual breaking, it is preferable that the sheet-shaped fired body is put in a plastic bag, which is made into a vacuum pack by a vacuum packaging machine to fix the sheet-shaped fired body in the plastic bag and then grind the sheet-shaped fired body by bending the plastic bag itself by hand. In this case, a plastic bag for preventing static electricity or preventing electrification is preferably used for the plastic bag in which the sheet-shaped fired body is put.

A porous plate-shaped filler aggregate (powder of porous plate-shaped fillers) including a plurality of porous plate-shaped fillers as a ground product is obtained by grinding the sheet-shaped fired body along the cut by various kinds of these methods. The porous plate-shaped fillers composing this porous plate-shaped filler aggregate are ground along the latticed cut, so that the deviation of the maximum length is small and the shape is uniform.

Examples of another producing method for a porous plate-shaped filler aggregate of the present invention include a method for not forming a cut at the stage of a green sheet to form a cut after firing a green sheet into a sheet-shaped fired body. A method for forming a cut in a sheet-shaped fired body, the depth of a cut, and a method for grinding a sheet-shaped fired body are the same as the producing method for forming a cut at the stage of a green sheet. Incidentally, in the producing method for forming a cut in a sheet-shaped fired body, the sheet-shaped fired body in which a cut is formed may be transferred to the pressure sensitive adhesive sheet of a thermal peeling type as described above, and thereafter ground by bending the pressure sensitive adhesive sheet itself by hand. In this case, the porous plate-shaped filler aggregate as a ground product is peeled off the pressure sensitive adhesive sheet and collected by heating the pressure sensitive adhesive sheet to predetermined temperature to deteriorate adhesive strength. Also, it is possible to produce the porous plate-shaped filler aggregate of the present invention by directly cutting the sheet-shaped fired body into predetermined filler shape instead of forming the cut in the sheet-shaped fired body and grinding.

3. Heat-Insulation Film

Figure 20:
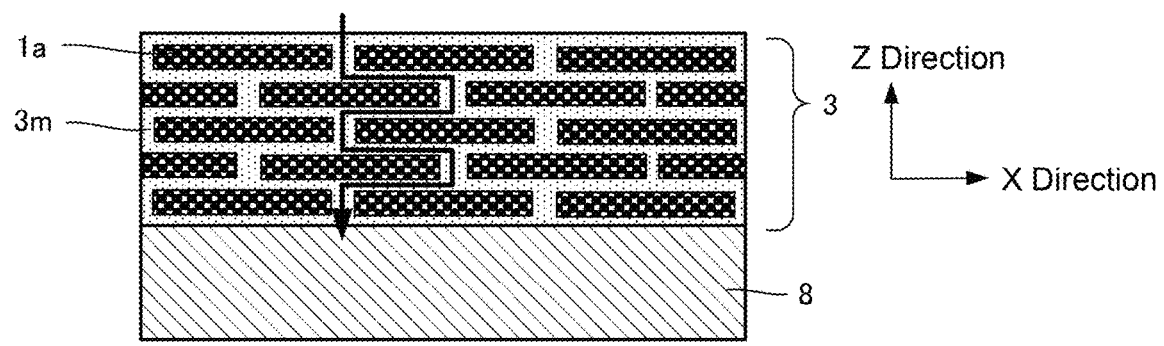
FIG. 20 is a cross-sectional view schematically showing an example of an embodiment of a heat-insulation film of the present invention.

Next, a heat-insulation film of the present invention is described. The heat-insulation film of the present invention contains a porous plate-shaped filler aggregate of the present invention. Specifically, as shown in FIG. 20, a heat-insulation film 3 of the present invention is such that porous plate-shaped fillers 1a composing the porous plate-shaped filler aggregate of the present invention are disposed while dispersed into a matrix 3m for binding the porous plate-shaped fillers 1a. The matrix 3m is a component existing in the periphery of the porous plate-shaped fillers 1a or between these particles, and a component for binding these particles.

As shown in FIG. 20, with regard to the heat-insulation film 3 of the present invention, the porous plate-shaped fillers 1a are preferably disposed in a layered state (laminated). The disposition in a layered state herein signifies that the porous plate-shaped fillers 1a exist in the matrix 3m in a state such that a plurality of the porous plate-shaped fillers 1a are aligned in the direction in which the direction of the minimum length of the porous plate-shaped fillers 1a is parallel to the thickness direction of the heat-insulation film 3. Incidentally, at this time, the position of the porous plate-shaped fillers 1a (the position of the center of gravity) does not need to be disposed orderly and periodically in X, Y and Z directions of the heat-insulation film 3 (here, the Z direction is regarded as the thickness direction), and has no problem in existing at random. The porous plate-shaped fillers 1a are laminated in a layered state in the heat-insulation film 3, so that a heat transfer pathway can be refracted and lengthened as an arrow in the FIG. to allow heat insulation effect to be improved. In particular, it is preferable that the position of the porous plate-shaped fillers 1a is not arranged orderly in the Z direction (shifted alternately) as shown in FIG. 20 for the reason that the heat transfer pathway is further refracted and lengthened.

The heat-insulation film 3 of the present invention preferably contains at least one kind of ceramics, glass and resin as the matrix 3m. From the viewpoint of heat resistance, ceramics or glass is more preferable. More specifically, examples of a material for the matrix 3m include silica, alumina, mullite, zirconia, titania, silicon nitride, silicon oxynitride, silicon carbide, silicon oxycarbide, calcium silicate, calcium aluminate, calcium aluminosilicate, aluminum phosphate, potassium aluminosilicate and glass. These are preferably amorphous from the viewpoint of thermal conductivity. Alternatively, in the case where a material for the matrix 3m is ceramics, an aggregate of particulates with a particle diameter of 500 nm or less is desirable. An aggregate of particulates with a particle diameter of 500 nm or less as the matrix 3m allows thermal conductivity to be further decreased. Also, in the case where a material for the matrix 3m is resin, examples of specific kinds of resin include silicone resin, polyimide resin, polyamide resin, acrylic resin and epoxy resin.

As shown by an arrow in FIG. 20, the matrix 3m portion with high thermal conductivity is the main heat transfer pathway, and the heat-insulation film 3 of the present invention contains the porous plate-shaped fillers 1a and the heat transfer pathway frequently detours around the direction of conducting heat with difficulty (the thickness direction of the film). That is to say, the length of the transfer pathway becomes so long as to allow thermal conductivity to be decreased. Also, the porous plate-shaped fillers 1a are in the shape of a plate, so that binding area among the fillers widens as compared with the case of using globular fillers. Then, as a result, the strength of the whole heat-insulation film is increased to cause erosion and peeling with difficulty.

With regard to the heat-insulation film 3, it is preferable that the porosity of the whole heat-insulation film 3 is 10 to 99%, the porosity of the porous plate-shaped fillers 1a is 20 to 99%, and the porosity of the matrix 3m is 0 to 70%.

With regard to the heat-insulation film 3 of the present invention, the thickness is preferably 1 μm to 5 mm. Such a thickness allows heat insulation effect without adversely affecting the properties of a base material 8 covered with the heat-insulation film 3. Incidentally, the thickness of the heat-insulation film 3 may be properly selected in the range in accordance with its usage.

Figure 21:
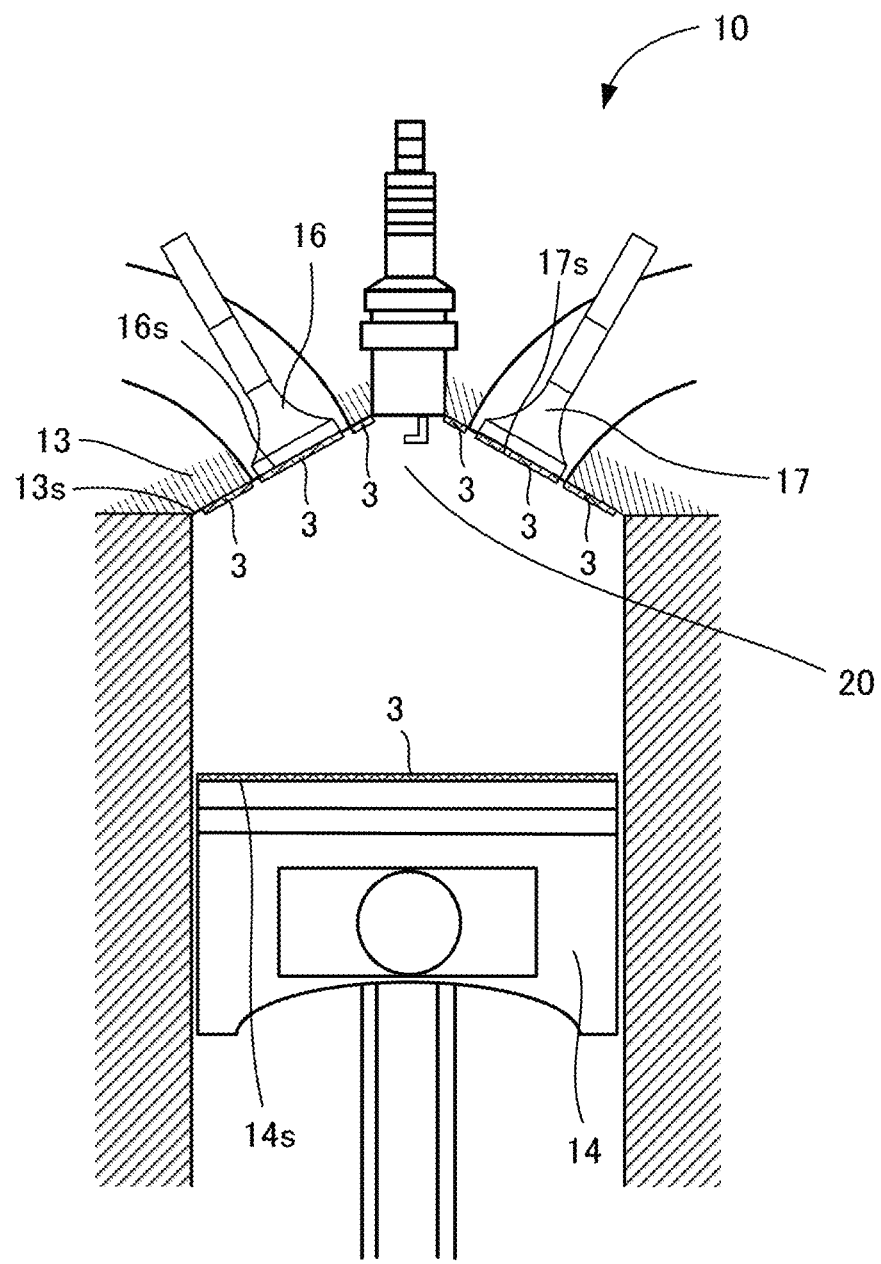
FIG. 21 is a cross-sectional view schematically showing an engine in which a heat-insulation film of the present invention is formed.

With regard to the heat-insulation film 3 of the present invention, volumetric heat capacity is preferably 1500 kJ/(m$^3$·K) or less, more preferably 1000 kJ/(m$^3$·K) or less, far more preferably 500 kJ/(m$^3$·K) or less. For example, as shown in FIG. 21, the heat-insulation film 3 with such a low volumetric heat capacity causes gas temperature in an engine combustion chamber 20 to lower easily after exhausting fuel in the case of forming the heat-insulation film 3 on the surface of an engine component composing the engine combustion chamber 20. Thus, the problem of abnormal combustion of an engine 10 may be restrained. Examples of the surface of an engine component appropriate for forming the heat-insulation film 3 include a top face 14s of a piston 14, a valve head 16s of an intake valve 16, a valve head 17s of an exhaust valve 17 and a bottom face 13s of a cylinder head 13.

With regard to the heat-insulation film 3 of the present invention, thermal conductivity is preferably 1 W/(m·K) or less, more preferably 0.5 W/(m·K) or less. The heat-insulation film 3 with such a low thermal conductivity allows heat transfer to be restrained and allows high heat insulation effect.

The heat-insulation film 3 of the present invention may be formed by applying, drying and/or heat-treating a coating composition on the base material 8. 'Coating composition' herein is a composition containing the porous plate-shaped filler aggregate of the present invention and one kind or more selected from the group consisting of inorganic binder, inorganic polymer, oxide sol and water glass. The coating composition may further contain dense fillers, a viscosity modifier, a liquid medium and a dispersing agent in addition to the components. Examples of a specific substance containable in the coating composition include cement, bentonite, aluminum phosphate, silica sol, alumina sol, boehmite sol, zirconia sol, titania sol, tetramethyl orthosilicate, tetraethyl orthosilicate, polysilazane, polycarbosilane, polyvinylsilane, polymethylsilane, polysiloxane, polysilsesquioxane, geopolymer and sodium silicate.

The application and drying and/or heating treatment of the coating composition may be repeatedly performed as required to thereby allow the thick heat-insulation film 3 to be formed. Alternatively, after forming the heat-insulation film 3 on a provisional base material, the single heat-insulation film 3 formed on a thin plate may be separately produced by removing the provisional base material to stick or bond this heat-insulation film 3 to the base material 8. Examples of a material for the base material 8 include metal, ceramics, glass, plastics, wood, cloth and paper. In particular, examples of the case where the base material 8 is made of metal include iron, iron alloy, stainless steel, aluminum, aluminum alloy, nickel alloy, cobalt alloy, tungsten alloy and copper alloy.

The base material (object) 8 on which the heat-insulation film 3 is formed (coated) is not particularly limited. Examples of the appropriate base material include an engine component of an automobile, piping, a wall of a building, and thermal cookware. Incidentally, the heat-insulation film of the present invention may be formed directly on the base material, or on the base material through one or more layers (films) having different properties from the heat-insulation film of the present invention. Also, the heat-insulation film of the present invention may be used while one or more layers (films) having different properties from the heat-insulation film of the present invention are laminated on the surface thereof.

EXAMPLES

The present invention is hereinafter described in further detail on the basis of examples and is not limited thereto.

Comparative Example 1

Figure 22:
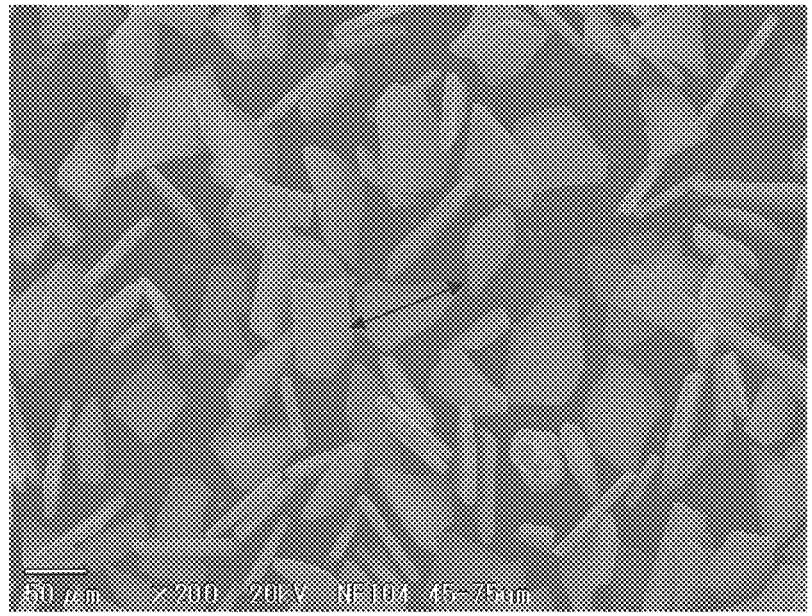
FIG. 22 is an electron micrograph of a porous plate-shaped filler aggregate obtained in Comparative Example 1.

Carbon black as a pore former, polyvinyl butyral resin (PVB) as a binder, dioctyl phthalate (DOP) as a plasticizer, xylene and 1-butanol as a liquid medium were added to yttria partially stabilized zirconia powder and mixed by a ball mill for 30 hours to prepare slurry for molding a green sheet. This slurry was adjusted to a viscosity of 4000 cps by performing vacuum defoaming treatment to thereafter form a green sheet by a doctor blade apparatus so that the thickness after firing was 10 μm. This green sheet was heated and degreased at 600° C. for 5 hours, and thereafter heated and fired at 1100° C. for 2 hours to obtain a sheet-shaped fired body. This sheet-shaped fired body was put on wire netting of a stainless sieve with an opening of 75 μm, and ground by pressing a rubber spatula thereagainst Thereafter, the sheet-shaped fired body was classified by using a stainless sieve with an opening of 40 μm and 63 μm. The porous plate-shaped fillers (particles) were optionally selected by 20 pieces from the porous plate-shaped filler aggregate (powder of the porous plate-shaped fillers) as a ground product after classifying to measure the average value of the minimum length, the average value, standard deviation and deviation of the maximum length, and the average value and the minimum value of aspect ratio. Those values were shown in Tables 1 and 2. Also, the evaluations were performed by regarding the case where the deviation of the maximum length was 10% or less and the minimum value of aspect ratio was 3 or more as 'pass' and the case except it as 'failure' to show the evaluation results in the Tables. In addition, an electron micrograph of the obtained porous plate-shaped filler aggregate was shown in FIG. 22. In this electron micrograph of FIG. 22, the length of the portion denoted by an arrow is the maximum length of the porous plate-shaped fillers. Incidentally, with regard to these porous plate-shaped fillers, the thermal conductivity was 0.2 W/(m·K), the volumetric heat capacity was 900 kJ/($m^3$·K), the average pore diameter was 150 nm, and the porosity was 65%.

Next, a coating composition containing the obtained porous plate-shaped filler aggregate, polysiloxane as a material for a matrix, and isopropyl alcohol was prepared, applied on an aluminum alloy as a base material, dried and thereafter heat-treated at 200° C. to form a heat-insulation film. With regard to the formed heat-insulation film, the porous plate-shaped fillers were laminated by 10 sheets or more in the thickness direction thereof, and the thickness was approximately 100 µm. The thermal conductivity of this heat-insulation film was measured to show the value in Table 3.

Examples 1 and 2 and Comparative Example 2

Figure 23:
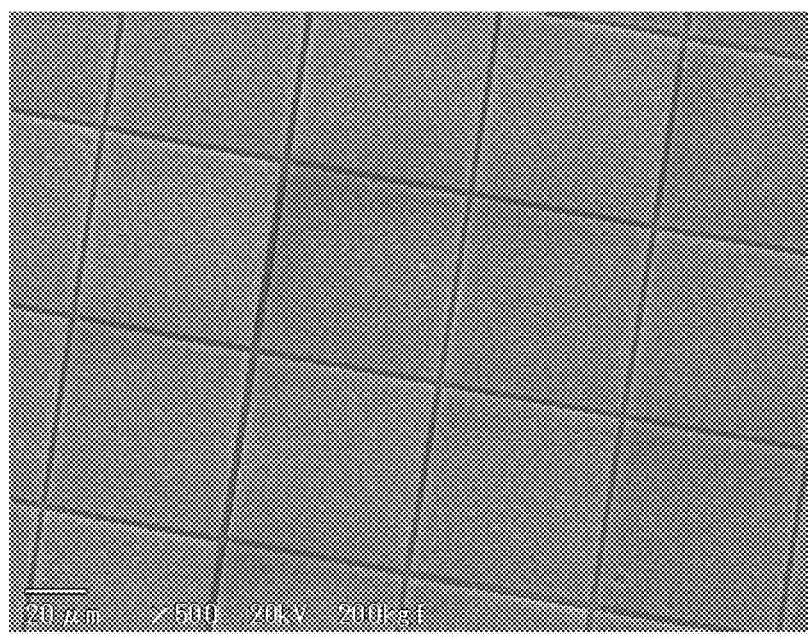
FIG. 23 is an electron micrograph of a sheet-shaped fired body before grinding in Example 2.
Figure 24:
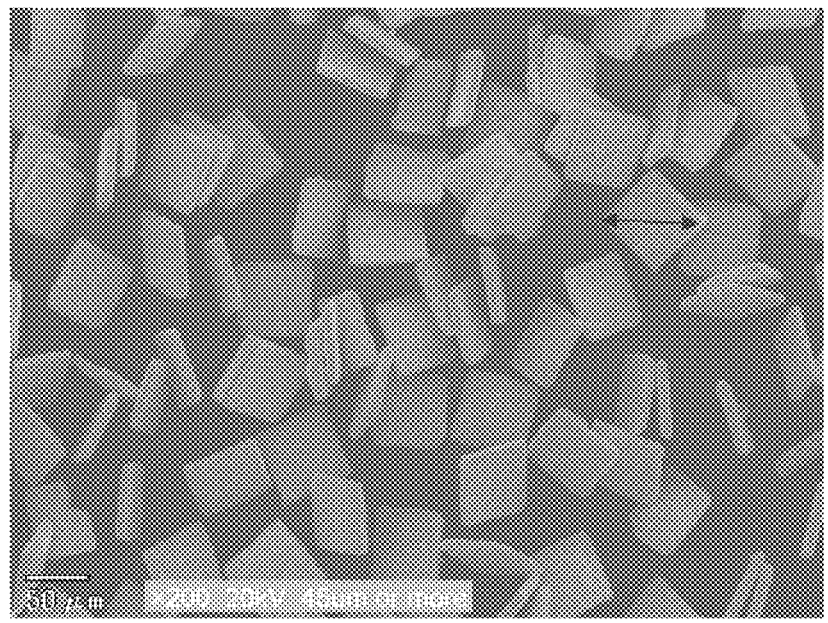
FIG. 24 is an electron micrograph of a porous plate-shaped filler aggregate obtained in Example 2.
Figure 25:
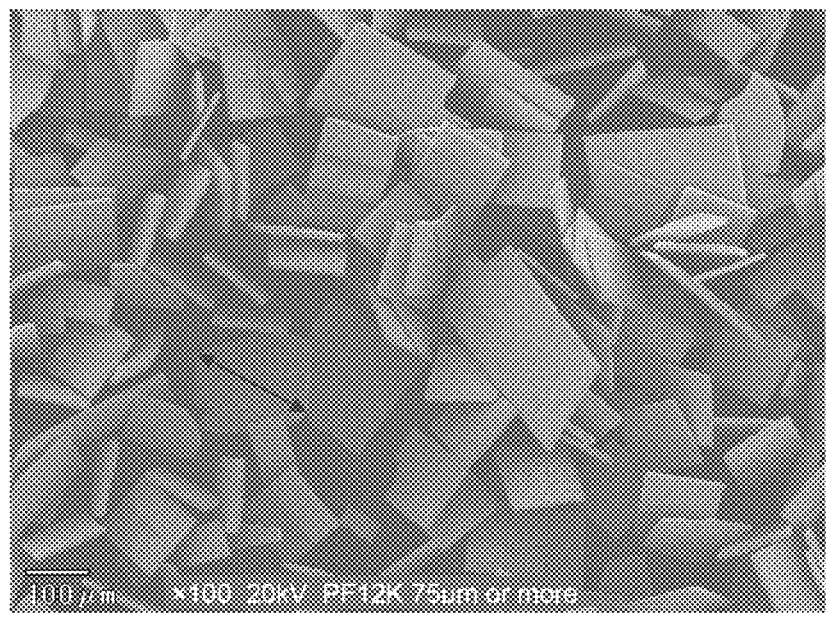
FIG. 25 is an electron micrograph of a porous plate-shaped filler aggregate obtained in Comparative Example 2.

A green sheet was formed in the same manner as Comparative Example 1. An edged tool having a latticed edge was pressed against one surface of this green sheet by using a material testing machine to form a latticed cut. The pressure at which the edged tool was pressed against one surface of the green sheet and the depth of the formed cut were as shown in Table 1. Incidentally, the depth of the cut was measured by using a laser microscope. The green sheet on which the cut was thus formed was degreased and fired in the same manner as Comparative Example 1 to obtain a sheet-shaped fired body. The obtained sheet-shaped fired body was put in a cleaning vessel (a glass vessel) of an ultrasonic cleaner to further inject ethanol to such a degree that this sheet-shaped fired body was sufficiently immersed. Then, the sheet-shaped fired body was vibrated and ground at ultrasonic waves with a frequency of 35 kHz for several minutes by the ultrasonic cleaner to obtain a porous plate-shaped filler aggregate (powder of the porous plate-shaped fillers) as a ground product. The porous plate-shaped fillers (particles) were optionally selected by 20 pieces from this porous plate-shaped filler aggregate to measure the average value of the minimum length, the average value, standard deviation and deviation of the maximum length, and the average value and the minimum value of aspect ratio, which values were shown in Table 1. Also, the evaluations were performed on the basis of the same standard as Comparative Example 1 to show the evaluation results in the Table. In addition, with regard to Example 2, an electron micrograph of the sheet-shaped fired body before grinding and an electron micrograph of the porous plate-shaped filler aggregate obtained by grinding were shown in FIGS. 23 and 24 respectively. Also, with regard to Comparative Example 2, an electron micrograph of the porous plate-shaped filler aggregate obtained by grinding was shown in FIG. 25. In the electron micrographs of FIGS. 24 and 25, the length of the portion denoted by an arrow is the maximum length of the porous plate-shaped fillers. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 3

A porous plate-shaped filler aggregate (powder of the porous plate-shaped fillers) as a ground product was obtained in the same manner as Example 2 except for grinding the sheet-shaped fired body by manual breaking without using an ultrasonic cleaner. Incidentally, manual breaking was performed by a method such that the sheet-shaped fired body is put in a plastic bag for preventing static electricity, which is made into a vacuum pack by a vacuum packaging machine to fix the sheet-shaped fired body in the plastic bag and thereafter bend the sheet-shaped fired body by hand by the plastic bag itself. The porous plate-shaped fillers (particles) were optionally selected by 20 pieces from the porous plate-shaped filler aggregate thus obtained to measure the average value of the minimum length, the average value, standard deviation and deviation of the maximum length, and the average value and the minimum value of aspect ratio, which values were shown in Table 1. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 4

A green sheet was formed in the same manner as Comparative Example 1. This green sheet was heated and degreased at 600° C. for 5 hours, and thereafter heated and fired at 1100° C. for 2 hours to obtain a sheet-shaped fired body. An edged tool having a latticed edge was pressed against one surface of this sheet-shaped fired body by using a material testing machine to form a latticed cut. The pressure at which the edged tool was pressed against one surface of the sheet-shaped fired body and the depth of the formed cut were as shown in Table 1. Incidentally, the depth of the cut was measured by using a laser microscope. The sheet-shaped fired body on which the cut was thus formed was ground in the same manner as Examples 1 and 2 and Comparative Example 2 to obtain a porous plate-shaped filler aggregate (powder of the porous plate-shaped fillers) as a ground product. The porous plate-shaped fillers (particles) were optionally selected by 20 pieces from this porous plate-shaped filler aggregate to measure the average value of the minimum length, the average value, standard deviation and deviation of the maximum length, and the average value and the minimum value of aspect ratio, which values were shown in Table 1. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 5

A porous plate-shaped filler aggregate (powder of the porous plate-shaped fillers) as a ground product was obtained in the same manner as Example 4 except for grinding the sheet-shaped fired body by manual breaking without using an ultrasonic cleaner. Incidentally, manual breaking was performed by a method such that a pressure sensitive adhesive sheet of a thermal peeling type was stuck on a surface on the opposite side to the surface on which a cut of the sheet-shaped fired body was formed to thereafter grind the sheet-shaped fired body by bending the pressure sensitive adhesive sheet itself by hand. After grinding, the porous plate-shaped filler aggregate as a ground product was peeled off the pressure sensitive adhesive sheet by heating the pressure sensitive adhesive sheet to predetermined temperature to deteriorate adhesive strength. The porous plate-shaped fillers (particles) were optionally selected by 20 pieces from the porous plate-shaped filler aggregate thus obtained to measure the average value of the minimum length, the average value, standard deviation and deviation of the maximum length, and the average value and the minimum value of aspect ratio, which values were shown in Table 1. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Examples 6 and 7 and Comparative Example 3

Figure 26:
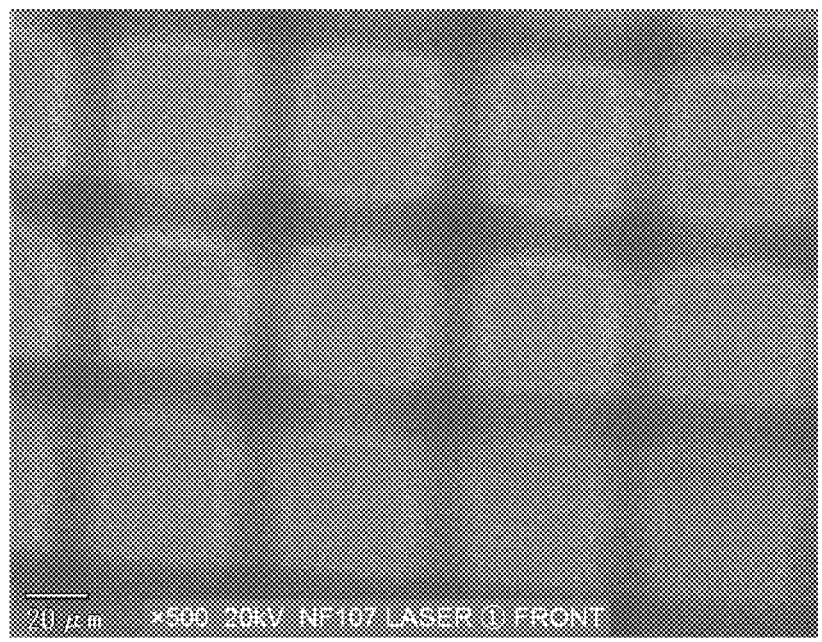
FIG. 26 is an electron micrograph of a sheet-shaped fired body before grinding in Example 7.
Figure 27:
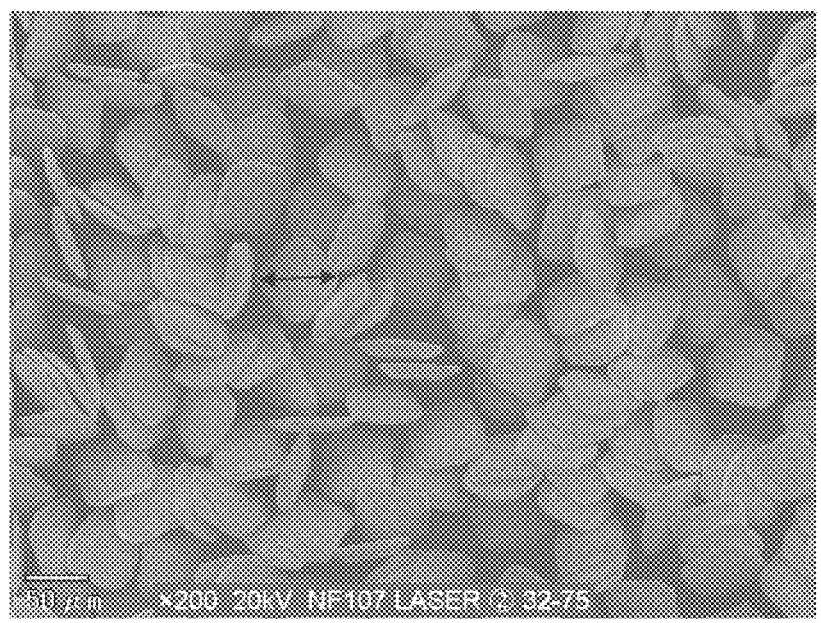
FIG. 27 is an electron micrograph of a porous plate-shaped filler aggregate obtained in Example 7.

A green sheet was formed in the same manner as Comparative Example 1. A latticed cut was formed on one surface of this green sheet by using a laser processing machine. A laser processing machine for irradiating laser at a pulse width of 10 pico-second or less was used for the laser processing machine. The frequency and output of the laser and the depth of the formed cut were as shown in Table 2. Incidentally, the depth of the cut was measured by using a laser microscope. The green sheet on which the cut was thus formed was degreased and fired in the same manner as Comparative Example 1 to obtain a sheet-shaped fired body. The obtained sheet-shaped fired body was ground in the same manner as Examples 1 and 2 and Comparative Example 2 to obtain a porous plate-shaped filler aggregate (powder of the porous plate-shaped fillers) as a ground product. The porous plate-shaped fillers (particles) were optionally selected by 20 pieces from this porous plate-shaped filler aggregate to measure the average value of the minimum length, the average value, standard deviation and deviation of the maximum length, and the average value and the minimum value of aspect ratio, which values were shown in Table 2. Also, the evaluations were performed on the basis of the same standard as Comparative Example 1 to show the evaluation results in the Table. In addition, with regard to Example 7, an electron micrograph of the sheet-shaped fired body before grinding and an electron micrograph of the porous plate-shaped filler aggregate obtained by grinding were shown in FIGS. 26 and 27 respectively. In the electron micrograph of FIG. 27, the length of the portion denoted by an arrow is the maximum length of the porous plate-shaped fillers. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 8

A porous plate-shaped filler aggregate (powder of the porous plate-shaped fillers) as a ground product was obtained in the same manner as Example 7 except for grinding the sheet-shaped fired body by manual breaking without using an ultrasonic cleaner. Incidentally, a specific method of manual breaking is the same as Example 3. The porous plate-shaped fillers (particles) were optionally selected by 20 pieces from the porous plate-shaped filler aggregate thus obtained to measure the average value of the minimum length, the average value, standard deviation and deviation of the maximum length, and the average value and the minimum value of aspect ratio, which values were shown in Table 2. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 9

A sheet-shaped fired body was formed in the same manner as Example 4. A latticed cut was formed on one surface of this sheet-shaped fired body by using a laser processing machine. A laser processing machine for irradiating laser at a pulse width of 10 pico-second or less was used for the laser processing machine. The frequency and output of the laser and the depth of the formed cut were as shown in Table 2. Incidentally, the depth of the cut was measured by using a laser microscope. The sheet-shaped fired body on which the cut was thus formed was ground in the same manner as Examples 1 and 2 and Comparative Example 2 to obtain a porous plate-shaped filler aggregate (powder of the porous plate-shaped fillers) as a ground product. The porous plate-shaped fillers (particles) were optionally selected by 20 pieces from this porous plate-shaped filler aggregate to measure the average value of the minimum length, the average value, standard deviation and deviation of the maximum length, and the average value and the minimum value of aspect ratio, which values were shown in Table 2. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Example 10

A porous plate-shaped filler aggregate (powder of the porous plate-shaped fillers) as a ground product was obtained in the same manner as Example 9 except for grinding the sheet-shaped fired body by manual breaking without using an ultrasonic cleaner. Incidentally, manual breaking was performed by a method such that a pressure sensitive adhesive sheet of a thermal peeling type was stuck on the surface on which a cut of the sheet-shaped fired body was formed to thereafter grind the sheet-shaped fired body by bending the pressure sensitive adhesive sheet itself by hand. After grinding, the porous plate-shaped filler aggregate as a ground product was peeled off the pressure sensitive adhesive sheet by heating the pressure sensitive adhesive sheet to predetermined temperature to deteriorate adhesive strength. The porous plate-shaped fillers (particles) were optionally selected by 20 pieces from the porous plate-shaped filler aggregate thus obtained to measure the average value of the minimum length, the average value, standard deviation and deviation of the maximum length, and the average value and the minimum value of aspect ratio, which values were shown in Table 1. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1. Also, a heat-insulation film was formed in the same manner as Comparative Example 1 by using the obtained porous plate-shaped filler aggregate. The thermal conductivity of the heat-insulation film thus formed was measured to show the value in Table 3.

Examples 11 to 13

A porous plate-shaped filler aggregate (powder of the porous plate-shaped fillers) as a ground product was obtained in the same manner as Examples 6 and 7 except for modifying the depth of the cut by a laser processing machine and the size of the fillers after firing. The porous plate-shaped fillers (particles) were optionally selected by 20 pieces from the porous plate-shaped filler aggregate thus obtained to measure the average value of the minimum length, the average value, standard deviation and deviation of the maximum length, and the average value and the minimum value of aspect ratio, which values were shown in Table 2. Also, the evaluations were performed on the basis of the same standard as Comparative Example 1 to show the evaluation results in the Table. Incidentally, the values of thermal conductivity, volumetric heat capacity, average pore diameter and porosity of these porous plate-shaped fillers were the same as those values in Comparative Example 1.

TABLE 1

| | | FORMING CONDITIONS AND GRINDING CONDITIONS OF CUT | | | | MINIMUM LENGTH OF FILLERS AFTER FIRING | MAXIMUM LENGTH OF FILLERS AFTER FIRING | | | ASPECT RATIO OF FILLERS AFTER FIRING | | EVALUATIONS |
|---|---|---|---|---|---|---|---|---|---|---|---|---|
| | | | PRESSURE FOR PRESSING EDGED TOOL [MPa] | DEPTH OF CUT [μm] | | | | | | | | |
| | CUT | TARGET FOR CUT | | | GRINDING METHOD | SIEVE CLASSIFICATION | AVERAGE VALUE [μm] | AVERAGE VALUE [μm] | STANDARD DEVIATION | DEVIATION [%] | AVERAGE VALUE | MINIMUM VALUE | |
| COMPARATIVE EXAMPLE 1 | ABSENT | — | — | — | PRESSING OF RUBBER SPATULA | PRESENT | 9.0 | 81.7 | 23.5 | 28.8 | 9.1 | 3.1 | FAILURE |
| COMPARATIVE EXAMPLE 2 | PRESENT | GREEN SHEET | 2 | 1 | ULTRASONIC CLEANER (FREQUENCY 35 kHz) | ABSENT | 9.0 | 159.1 | 59.4 | 37.3 | 17.7 | 6.9 | FAILURE |
| EXAMPLE 1 | PRESENT | GREEN SHEET | 5 | 2 | ULTRASONIC CLEANER (FREQUENCY 35 kHz) | ABSENT | 9.0 | 81.3 | 3.5 | 4.3 | 9.0 | 8.5 | PASS |
| EXAMPLE 2 | PRESENT | GREEN SHEET | 20 | 7 | ULTRASONIC CLEANER (FREQUENCY 35 kHz) | ABSENT | 9.0 | 78.0 | 2.1 | 2.7 | 8.7 | 8.3 | PASS |
| EXAMPLE 3 | PRESENT | GREEN SHEET | 20 | 7 | MANUAL BREAKING AFTER VACUUM PACK | ABSENT | 9.0 | 80.2 | 3.1 | 3.9 | 8.9 | 8.4 | PASS |
| EXAMPLE 4 | PRESENT | SHEET-SHAPED FIRED BODY | 18 | 7 | ULTRASONIC CLEANER (FREQUENCY 35 kHz) | ABSENT | 9.0 | 80.2 | 2.0 | 2.5 | 8.9 | 8.6 | PASS |
| EXAMPLE 5 | PRESENT | SHEET-SHAPED FIRED BODY | 18 | 7 | MANUAL BREAKING ON PRESSURE SENSITIVE ADHESIVE SHEET OF THERMAL PEELING TYPE | ABSENT | 9.0 | 80.5 | 2.2 | 2.7 | 8.9 | 8.6 | PASS |

TABLE 2

| | FORMING CONDITIONS AND GRINDING CONDITIONS OF CUT | | | | | | MINIMUM LENGTH OF FILLERS AFTER FIRING AVERAGE VALUE [μm] | MAXIMUM LENGTH OF FILLERS AFTER FIRING | | | ASPECT RATIO OF FILLERS AFTER FIRING | | EVALUATIONS |
|---|---|---|---|---|---|---|---|---|---|---|---|---|---|
| | CUT | IRRADIATING CONDITIONS OF LASER | | | DEPTH OF CUT [μm] | GRINDING METHOD | SIEVE CLASSIFICATION | | AVERAGE VALUE [μm] | STANDARD DEVIATION | STANDARD DEVIATION [%] | AVERAGE VALUE | MINIMUM VALUE | |
| | | TARGET FOR CUT | FREQUENCY, OUTPUT | | | | | | | | | | | |
| COMPARATIVE EXAMPLE 1 | ABSENT | — | — | — | — | PRESSING OF RUBBER SPATULA | PRESENT | 9.0 | 81.7 | 23.5 | 28.8 | 9.1 | 3.1 | FAILURE |
| COMPARATIVE EXAMPLE 3 | PRESENT | GREEN SHEET | 200 kHz 2.0 W | | 1 | ULTRASONIC CLEANER (FREQUENCY 35 kHz) | ABSENT | 9.0 | 125.3 | 33.5 | 26.7 | 13.9 | 6.7 | FAILURE |
| EXAMPLE 6 | PRESENT | GREEN SHEET | 200 kHz 2.5 W | | 2 | ULTRASONIC CLEANER (FREQUENCY 35 kHz) | ABSENT | 9.0 | 67.3 | 4.1 | 6.1 | 7.5 | 7.1 | PASS |
| EXAMPLE 7 | PRESENT | GREEN SHEET | 200 kHz 2.5 W | | 5 | ULTRASONIC CLEANER (FREQUENCY 35 kHz) | ABSENT | 9.0 | 66.4 | 3.8 | 5.7 | 7.4 | 6.9 | PASS |
| EXAMPLE 8 | PRESENT | GREEN SHEET | 200 kHz 2.5 W | | 5 | MANUAL BREAKING AFTER VACUUM PACK | ABSENT | 9.0 | 66.8 | 4.0 | 6.0 | 7.4 | 7.0 | PASS |
| EXAMPLE 9 | PRESENT | SHEET-SHAPED FIRED BODY | 200 kHz 2.5 W | | 4 | ULTRASONIC CLEANER (FREQUENCY 35 kHz) | ABSENT | 9.0 | 70.3 | 2.5 | 3.6 | 7.8 | 7.6 | PASS |
| EXAMPLE 10 | PRESENT | SHEET-SHAPED FIRED BODY | 200 kHz 2.5 W | | 4 | MANUAL BREAKING ON PRESSURE SENSITIVE ADHESIVE SHEET OF THERMAL PEELING TYPE | ABSENT | 9.0 | 70.5 | 2.8 | 4.0 | 7.8 | 7.5 | PASS |
| EXAMPLE 11 | PRESENT | GREEN SHEET | 200 kHz 2.0 W | | 1 | ULTRASONIC CLEANER (FREQUENCY 35 kHz) | ABSENT | 3.0 | 81.1 | 5.3 | 6.5 | 27.0 | 24.9 | PASS |
| EXAMPLE 12 | PRESENT | GREEN SHEET | 200 kHz 2.5 W | | 5 | ULTRASONIC CLEANER (FREQUENCY 35 kHz) | ABSENT | 24.5 | 81.5 | 4.4 | 5.4 | 3.3 | 3.1 | PASS |
| EXAMPLE 13 | PRESENT | GREEN SHEET | 200 kHz 3.5 W | | 10 | ULTRASONIC CLEANER (FREQUENCY 35 kHz) | ABSENT | 45.0 | 150.3 | 8.5 | 5.7 | 3.3 | 3.0 | PASS |

TABLE 3

| | MATERIAL FOR MATRIX | THICKNESS OF HEAT-INSULATION FILM [μm] | THERMAL CONDUCTIVITY OF HEAT-INSULATION FILM [W/(m · K)] |
| --- | --- | --- | --- |
| COMPARATIVE EXAMPLE 1 | POLYSILOXANE | 100 | 1.1 |
| COMPARATIVE EXAMPLE 2 | POLYSILOXANE | 100 | 1.4 |
| EXAMPLE 1 | POLYSILOXANE | 100 | 0.6 |
| EXAMPLE 2 | POLYSILOXANE | 100 | 0.5 |
| EXAMPLE 3 | POLYSILOXANE | 100 | 0.5 |
| EXAMPLE 4 | POLYSILOXANE | 100 | 0.4 |
| EXAMPLE 5 | POLYSILOXANE | 100 | 0.5 |
| COMPARATIVE EXAMPLE 3 | POLYSILOXANE | 100 | 1.2 |
| EXAMPLE 6 | POLYSILOXANE | 100 | 0.8 |
| EXAMPLE 7 | POLYSILOXANE | 100 | 0.6 |
| EXAMPLE 8 | POLYSILOXANE | 100 | 0.7 |
| EXAMPLE 9 | POLYSILOXANE | 100 | 0.6 |
| EXAMPLE 10 | POLYSILOXANE | 100 | 0.7 |

(Consideration)

As shown in Tables 1 and 2, with regard to the porous plate-shaped filler aggregate of Examples 1 to 13 as examples of the present invention, the deviation of the maximum length of the porous plate-shaped fillers composing it was as small as 10% or less, the shape was uniform, and the minimum value of aspect ratio was 3 or more. On the other hand, with regard to the porous plate-shaped filler aggregate of Comparative Example 1 produced by grinding without forming the cut, the deviation of the maximum length of the porous plate-shaped fillers composing it significantly exceeded 10%, and the shape was non-uniform. Also, with regard to the porous plate-shaped filler aggregate of Comparative Examples 2 and 3 produced using the depth of the cut at less than 0.2 time the thickness of the green sheet after firing, the deviation of the maximum length of the porous plate-shaped fillers composing it significantly exceeded 10%, and the shape was non-uniform.

Also, as shown in Table 3, the heat-insulation film formed from the coating composition containing the porous plate-shaped filler aggregate of Examples 1 to 10 has such a low thermal conductivity of 1 W/(m·K) or less as to allow high heat insulation effect to be expected. On the other hand, the heat-insulation film formed from the coating composition containing the porous plate-shaped filler aggregate of Comparative Examples 1 to 3 exceeded 1 W/(m·K) in thermal conductivity. With regard to the heat-insulation film containing the porous plate-shaped filler aggregate of Comparative Examples 1 to 3, the same heat insulation effect as the heat-insulation film formed from the coating composition containing the porous plate-shaped filler aggregate of Examples 1 to 10 may not be expected.

INDUSTRIAL APPLICABILITY

The present invention may be appropriately used for a heat-insulation film for improving heat insulation effect of an engine component of an automobile, piping, a wall of a building, and thermal cookware.

DESCRIPTION OF REFERENCE NUMERALS

1: porous plate-shaped filler aggregate, 1a: porous plate-shaped fillers, 3: heat-insulation film, 3m: matrix, 5: cut, 7: covering layer, 8: base material, 10: engine, 13: cylinder head, 13s: bottom face (of cylinder head), 14: piston, 14s: top face (of piston), 16: intake valve, 16s: valve head, 17: exhaust valve, 17s: valve head, 20: engine combustion chamber, 31: film, 32: green sheet, 33: edged tool, 34: pressure sensitive adhesive sheet, 35: laser processing machine, 36: refractory product, 40: sheet-shaped fired body, 41: liquid, 42: cleaning vessel (of ultrasonic cleaner)

The invention claimed is:

1. A heat-insulation film comprising a plurality of porous plate-shaped fillers, wherein the fillers are arranged as adjacent layers of fillers in the film, the porous plate-shaped fillers have a uniform plate shape with an aspect ratio of 3 or more, a thickness of 0.1 to 50 μm, a porosity of 20 to 99%, and a deviation of a length among a plurality of the porous plate-shaped fillers, obtained by the following formula, is 10% or less:

Deviation of the length (%)=standard deviation of the length/average value of the length×100.

2. The heat-insulation film according to claim 1, wherein the porous plate-shaped fillers have pores with an average pore diameter of 10 to 500 nm.

3. The heat-insulation film according to claim 1, wherein a thermal conductivity of the porous plate-shaped fillers is 1 W/(m·K) or less.

4. The heat-insulation film according to claim 1, wherein a volumetric heat capacity of the porous plate-shaped fillers is 10 to 3000 kJ/(m$^3$·K).

5. A method for producing the heat insulation film of claim 1, wherein during production of the plurality of porous plate-shaped fillers, a cut with a depth of 0.2 times or more a thickness of a green sheet after firing is formed on one surface of the green sheet formed from a material containing a component of the porous plate-shaped fillers to fire the green sheet and thereafter grind an obtained sheet-shaped fired body along the cut.

6. The method according to claim 5, wherein a method for forming the cut is a method by using an edged tool or a laser processing machine such as to allow laser irradiation at a pulse width of 10 pico-second or less.

7. The method according to claim 6, wherein the edged tool has a latticed edge.

8. The method according to claim 6, wherein a method for forming the cut on one surface of the green sheet by using the edged tool is a method for pressing the edged tool against one surface of the green sheet by a pressing machine or a rolling machine.

9. The method according to claim 8, wherein a pressure for pressing the edged tool against one surface of the green sheet is 3 MPa or more.

10. The method according to claim 5, wherein a method for grinding the sheet-shaped fired body along the cut is any method selected from the group consisting of a method by manual breaking, a method by using a grinder, a method by using a shredder and a method by irradiating ultrasonic waves.

11. A method for producing the heat insulation film of claim 1, wherein during production of the plurality of porous plate-shaped fillers, a green sheet formed from a material containing a component of the porous plate-shaped fillers is fired, and a cut with a depth of 0.2 times or more a thickness of a sheet-shaped fired body is formed on one surface of the obtained sheet-shaped fired body to grind the sheet-shaped fired body along the cut.

12. The method according to claim 11, wherein a method for forming the cut is a method by using an edged tool or a laser processing machine such as to allow laser irradiation at a pulse width of 10 pico-second or less.

13. The method according to claim 12, wherein the edged tool has a latticed edge.

14. The method according to claim 12, wherein a method for forming the cut on one surface of the sheet-shaped fired body by using the edged tool is a method for pressing the edged tool against one surface of the sheet-shaped fired body by a pressing machine or a rolling machine.

15. The method according to claim 14, wherein a pressure for pressing the edged tool against one surface of the sheet-shaped fired body is 3 MPa or more.

16. The method according to claim 11, wherein a method for grinding the sheet-shaped fired body along the cut is any method selected from the group consisting of a method by manual breaking, a method by using a grinder, a method by using a shredder and a method by irradiating ultrasonic waves.

17. The heat-insulation film according to claim 1, wherein a thickness of the film is 1 µm to 5 mm.

18. The heat-insulation film according to claim 1, wherein a thermal conductivity is 1 W/(m·K) or less.

* * * * *